US012693677B2

(12) United States Patent
Hammond et al.

(10) Patent No.: US 12,693,677 B2
(45) Date of Patent: Jul. 28, 2026

(54) INITIAL LOCATION DETERMINATION OF UNCREWED AERIAL VEHICLES FROM UNCALIBRATED LOCATION OBSERVATIONS

(71) Applicant: Wing Aviation LLC, Palo Alto, CA (US)

(72) Inventors: Marcus Hammond, Redwood City, CA (US); Jeremie Gabor, Mountain View, CA (US); Reia Cho, San Francisco, CA (US)

(73) Assignee: Wing Aviation LLC, Palo Alto, CA (US)

( * ) Notice: Subject to any disclaimer, the term of this patent is extended or adjusted under 35 U.S.C. 154(b) by 168 days.

(21) Appl. No.: 18/741,364

(22) Filed: Jun. 12, 2024

(65) Prior Publication Data

US 2024/0419180 A1 Dec. 19, 2024

Related U.S. Application Data

(60) Provisional application No. 63/521,209, filed on Jun. 15, 2023.

(51) Int. Cl.
G05D 1/244 (2024.01)
G05D 1/246 (2024.01)
(Continued)

(52) U.S. Cl.
CPC ......... G05D 1/2446 (2024.01); G05D 1/2462 (2024.01); G06T 7/74 (2017.01);
(Continued)

(58) Field of Classification Search
None
See application file for complete search history.

(56) References Cited

U.S. PATENT DOCUMENTS 9,056,676 B1 6/2015 Wang
9,964,951 B1 5/2018 Dunn et al.
(Continued)

FOREIGN PATENT DOCUMENTS

KR 20220048529 A * 4/2022 ............ B64U 80/25
WO 2017065411 A1 4/2017

OTHER PUBLICATIONS

Hammond, Marcus, U.S. Appl. No. 18/077,371, filed Dec. 8, 2022, 95 pages.

(Continued)

*Primary Examiner* — Amelia Vorce
(74) *Attorney, Agent, or Firm* — McDonnell Boehnen Hulbert & Berghoff LLP

(57) ABSTRACT

An uncrewed aerial vehicle (UAV) may be configured to hover above a particular charging pad within a portion of a cluster of charging pads for UAVs. The cluster may include the charging pads arranged in a layout and fiducial markers distributed at positions across the layout. While hovering above the particular charging pad, the UAV may capture an aerial image of the portion of the cluster. The UAV may derive cluster-portion observation data from the image, the cluster-portion observation data including information indicating a position of the particular charging pad, and positions of one or more fiducial markers within the portion of the cluster relative to the particular charging pad. The UAV may send the cluster-portion observation data to a computing system in an infrastructure support network for UAVs, and thereafter receive, from the computing system, location information indicating that UAV's geolocation is a geolocation of the particular charging pad.

20 Claims, 18 Drawing Sheets

(51) Int. Cl.
    *G05D 109/20*         (2024.01)
    *G06T 7/73*          (2017.01)

(52) U.S. Cl.
    CPC .................... *G05D 2109/20* (2024.01); *G06T 2207/10032* (2013.01); *G06T 2207/30204* (2013.01)

(56) References Cited

U.S. PATENT DOCUMENTS

| | | | |
|---|---|---|---|
| 10,223,666 B1 | 3/2019 | Palamarchuk et al. | |
| 11,287,835 B2 | 3/2022 | Jourdan et al. | |
| 2005/0090972 A1 | 4/2005 | Bodin et al. | |
| 2015/0353206 A1 | 12/2015 | Wang | |
| 2016/0039542 A1 | 2/2016 | Wang | |
| 2016/0122038 A1 | 5/2016 | Fleischman et al. | |
| 2016/0124431 A1* | 5/2016 | Kelso | G06K 7/1426 |
| | | | 701/28 |
| 2017/0011333 A1 | 1/2017 | Greiner et al. | |
| 2017/0017240 A1* | 1/2017 | Sharma | B64U 70/93 |
| 2017/0031369 A1 | 2/2017 | Liu et al. | |
| 2017/0323129 A1 | 11/2017 | Davidson et al. | |
| 2018/0053139 A1 | 2/2018 | Stoman | |
| 2018/0155011 A1* | 6/2018 | Greiner | G05D 1/102 |
| 2018/0178667 A1 | 6/2018 | Cumoli et al. | |
| 2018/0335520 A1* | 11/2018 | Tofte | G01S 17/42 |
| 2019/0197908 A1 | 6/2019 | Mozer et al. | |
| 2020/0012829 A1* | 1/2020 | Davidson | G05D 1/0234 |
| 2020/0130864 A1 | 4/2020 | Brockers et al. | |
| 2020/0165007 A1 | 5/2020 | Augugliaro et al. | |
| 2020/0225357 A1 | 7/2020 | Smits | |
| 2020/0301445 A1* | 9/2020 | Jourdan | G06K 19/06037 |
| 2021/0107682 A1* | 4/2021 | Kozlenko | B64U 80/25 |
| 2021/0225180 A1* | 7/2021 | S | G06T 7/70 |
| 2021/0284356 A1* | 9/2021 | Jourdan | B64F 1/18 |
| 2022/0171408 A1 | 6/2022 | Jourdan et al. | |
| 2022/0357753 A1* | 11/2022 | Schubert | G08G 5/57 |
| 2023/0356863 A1* | 11/2023 | Zhang | G08G 5/55 |
| 2023/0399132 A1* | 12/2023 | Kiyokami | B64C 39/024 |
| 2024/0094712 A1* | 3/2024 | Emerson | G05B 19/41835 |
| 2025/0157340 A1* | 5/2025 | Breut | B64D 45/0053 |
| 2025/0353623 A1* | 11/2025 | Zhu | G05D 1/0038 |

OTHER PUBLICATIONS

International Searching Authority, International Search Report and Written Opinion mailed Mar. 6, 2024, issued in connection with International Patent Application No. PCT/US2023/078831, filed Nov. 6, 2023, 13 pages.

International Searching Authority, International Search Report and Written Opinion, mailed on Jun. 2, 2502, issued in connection with International Patent Application No. PCT/US2020/020201, 8 pages.

International Searching Authority, International Search Report and Written Opinion mailed Jul. 4, 2025, issued in connection with International Patent Application No. PCT/US2024/033605, filed Jun. 12, 2024, 9 pages.

\* cited by examiner (a)
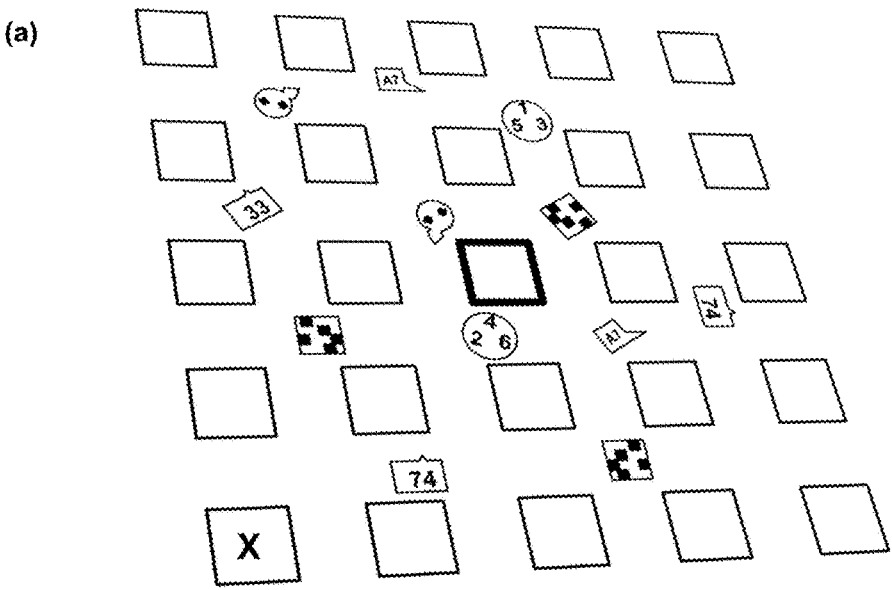
(b)
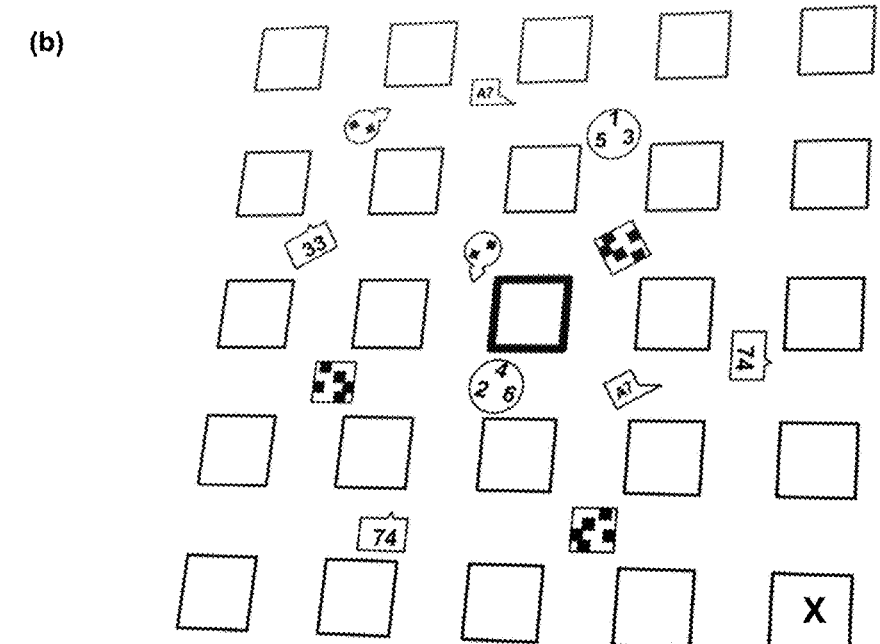
Figure 4D

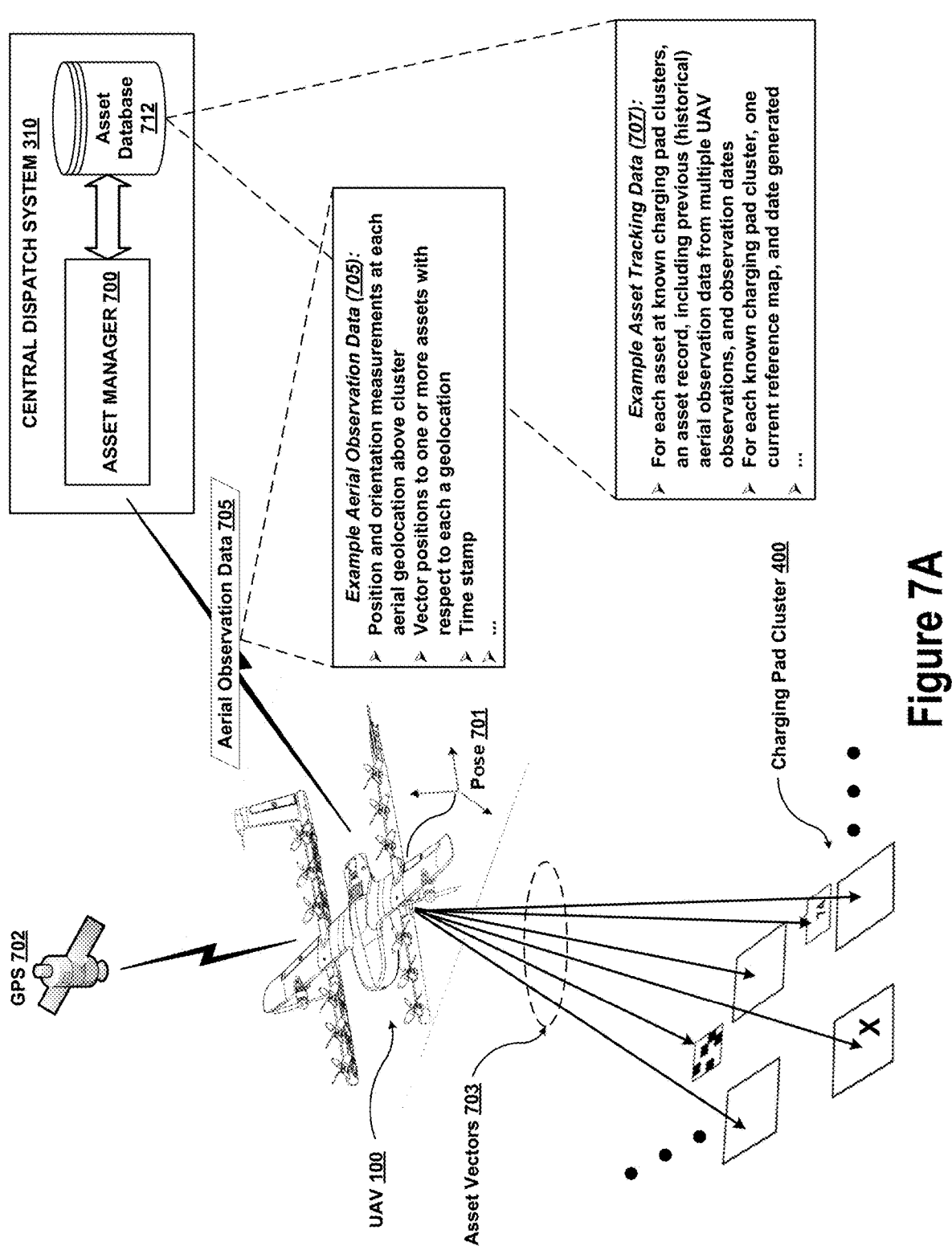

CENTRAL DISPATCH SYSTEM 310

Asset Database 712

ASSET MANAGER 700

Aerial Observation Data 705

*Example Aerial Observation Data (705):*
➢ Position and orientation measurements at each aerial geolocation above cluster
➢ Vector positions to one or more assets with respect to each a geolocation
➢ Time stamp
➢ ...

*Example Asset Tracking Data (707):*
➢ For each asset at known charging pad clusters, an asset record, including previous (historical) aerial observation data from multiple UAV observations, and observation dates
➢ For each known charging pad cluster, one current reference map, and date generated
➢ ...

GPS 702

UAV 100

Pose 701

Asset Vectors 703

X

Charging Pad Cluster 400

Figure 7A

Figure 7B:
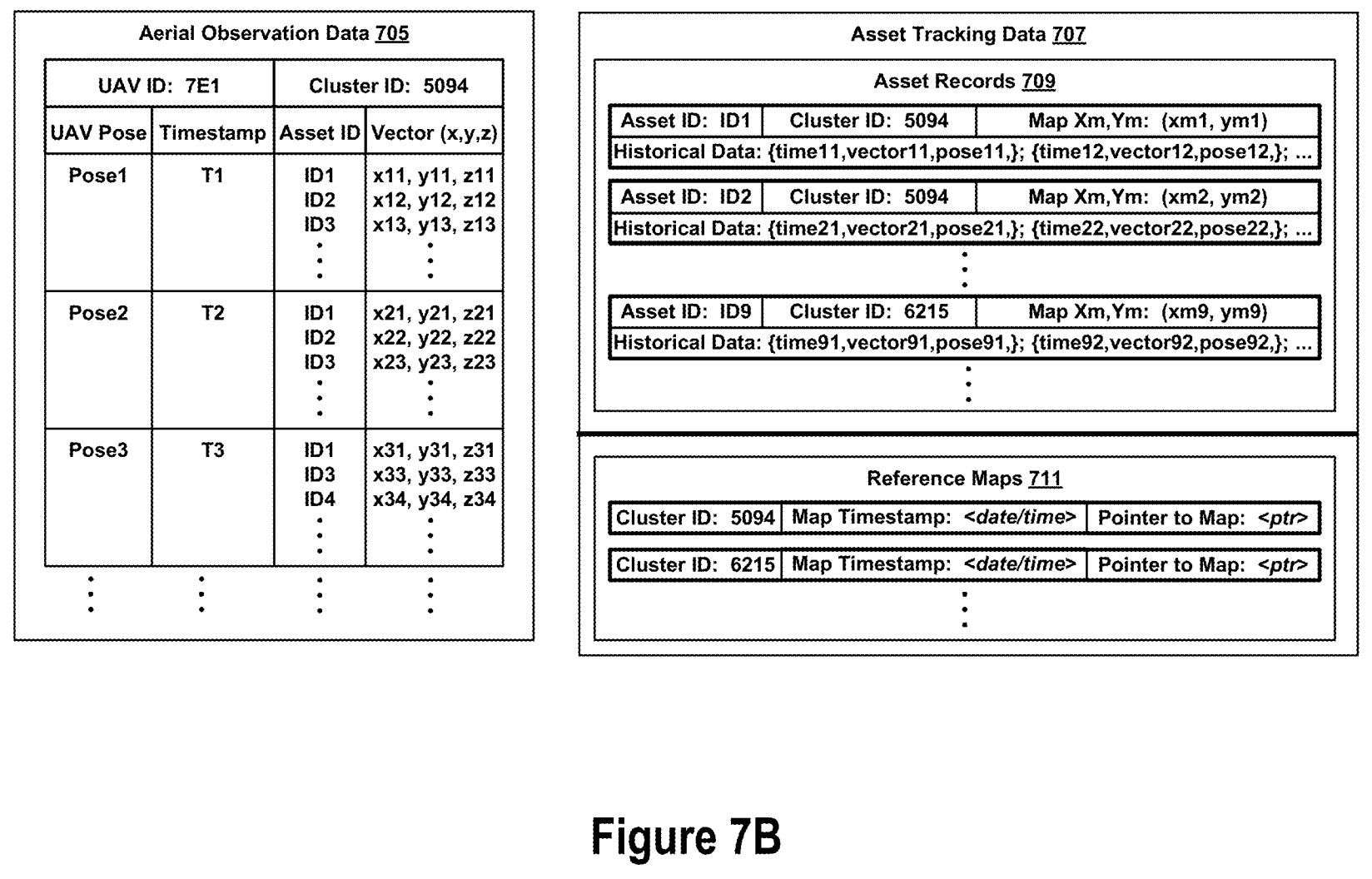

Asset Tracking Data 707

Asset Records 709

| Asset ID: ID1 | Cluster ID:  5094 | Map Xm,Ym:  (xm1, ym1) |
|---|---|---|
| Historical Data: {time11,vector11,pose11,}; {time12,vector12,pose12,}; ... | | |

| Asset ID: ID2 | Cluster ID:  5094 | Map Xm,Ym:  (xm2, ym2) |
|---|---|---|
| Historical Data: {time21,vector21,pose21,}; {time22,vector22,pose22,}; ... | | |

· · ·

| Asset ID: ID9 | Cluster ID:  6215 | Map Xm,Ym:  (xm9, ym9) |
|---|---|---|
| Historical Data: {time91,vector91,pose91,}; {time92,vector92,pose92,}; ... | | |

· · ·

Reference Maps 711

| Cluster ID:  5094 | Map Timestamp:  <date/time> | Pointer to Map:  <ptr> |
|---|---|---|
| Cluster ID:  6215 | Map Timestamp:  <date/time> | Pointer to Map:  <ptr> |

· · ·

Aerial Observation Data 705

| UAV ID:  7E1 | | Cluster ID:  5094 | |
|---|---|---|---|
| UAV Pose | Timestamp | Asset ID | Vector (x,y,z) |
| Pose1 | T1 | ID1 | x11, y11, z11 |
| | | ID2 | x12, y12, z12 |
| | | ID3 | x13, y13, z13 |
| | | · · · | · · · |
| Pose2 | T2 | ID1 | x21, y21, z21 |
| | | ID2 | x22, y22, z22 |
| | | ID3 | x23, y23, z23 |
| | | · · · | · · · |
| Pose3 | T3 | ID1 | x31, y31, z31 |
| | | ID3 | x33, y33, z33 |
| | | ID4 | x34, y34, z34 |
| | | · · · | · · · |
| · · · | | · · · | · · · |

RECEIVE, FROM A FIRST UAV, FIRST AERIAL OBSERVATION DATA OF
A PARTICULAR GROUND-BASED CLUSTER OF
CHARGING PADS FOR UAVS,
WHEREIN THE PARTICULAR CLUSTER COMPRISES CLUSTER ASSETS
INCLUDING THE CHARGING PADS ARRANGED IN A LAYOUT AND
A PLURALITY OF FIDUCIAL MARKERS DISTRIBUTED AT
POSITIONS ACROSS THE LAYOUT,
AND WHEREIN THE FIRST AERIAL OBSERVATION DATA COMPRISE
POSITION MEASUREMENTS OF THE FIRST UAV AT EACH OF ONE OR
MORE AERIAL GEOLOCATIONS ABOVE A LOCALE OF
THE PARTICULAR CLUSTER, AND VECTOR POSITIONS OF
AT LEAST A FIRST SUBSET OF THE CLUSTER ASSETS
WITH RESPECT TO THE ONE OR MORE AERIAL GEOLOCATIONS

1102

GENERATE A MAP GRAPH FROM AT LEAST
THE FIRST AERIAL OBSERVATION DATA,
WHEREIN THE MAP GRAPH COMPRISES
(i) NODES CORRESPONDING TO BOTH THE ONE OR MORE AERIAL
GEOLOCATIONS AND THE VECTOR POSITIONS OF
THE AT LEAST FIRST SUBSET OF THE CLUSTER ASSETS,
AND (ii) EDGES BETWEEN PAIRS OF SELECTED NODES,
THE EDGES CORRESPONDING TO DISTANCES BETWEEN
SELECTED NODES AND INCLUDING MEASUREMENT UNCERTAINTIES

1104

GENERATE A PARTICULAR SPATIAL MAP OF
AT LEAST A PARTICULAR SUBSET OF CLUSTER ASSETS OF
THE PARTICULAR GROUND-BASED CLUSTER
BY COMPUTATIONALLY OPTIMIZING THE MAP GRAPH

INITIAL LOCATION DETERMINATION OF UNCREWED AERIAL VEHICLES FROM UNCALIBRATED LOCATION OBSERVATIONS

CROSS REFERENCE TO RELATED APPLICATIONS

This application claims priority to U.S. provisional patent application No. 63/521,209, filed on Jun. 15, 2023, and titled "Initial Location Determination of Uncrewed Aerial Vehicles from Uncalibrated Location Observations," which is hereby incorporated by reference as if fully set forth in this description.

BACKGROUND

An uncrewed vehicle, which may also be referred to as an autonomous vehicle, is a vehicle capable of travel without a physically-present human operator. An uncrewed vehicle may operate in a remote-control mode, in an autonomous mode, or in a partially autonomous mode. The term "unmanned" may sometimes be used instead of, or in addition to, "uncrewed," and for the purposes of this disclosure, it should be understood that both terms have the same meaning, and may be used interchangeably.

When an uncrewed vehicle operates in a remote-control mode, a pilot or driver that is at a remote location can control the uncrewed vehicle via commands that are sent to the uncrewed vehicle via a wireless link. When the uncrewed vehicle operates in autonomous mode, the uncrewed vehicle typically moves based on pre-programmed navigation waypoints, dynamic automation systems, or a combination of these. Further, some uncrewed vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of uncrewed vehicles exist for various different environments. For instance, uncrewed vehicles exist for operation in the air, on the ground, underwater, and in space. Examples include quad-copters and tail-sitter uncrewed aerial vehicles (UAVs), among others. Uncrewed vehicles also exist for hybrid operations in which multi-environment operation is possible. Examples of hybrid uncrewed vehicles include an amphibious craft that is capable of operation on land as well as on water or a floatplane that is capable of landing on water as well as on land. Other examples are also possible.

SUMMARY

Examples disclosed herein include systems and methods involving automated location determination of aerial vehicles (UAVs) using observations obtained by the UAVs while operating in navigational state that may not be fully or even partially initialized.

In a first aspect, an uncrewed aerial vehicle (UAV) may comprise an imaging system and a control system. The control system may be configured to: cause the UAV to hover above a particular charging pad within a portion of a ground-based cluster of charging pads for UAVs, the cluster comprising the charging pads arranged in a layout and a plurality of fiducial markers distributed at positions across the layout; cause the imaging system capture an aerial image of the portion of the ground-based cluster, including the particular charging pad, while hovering above the particular charging pad; derive cluster-portion observation data from the aerial image, wherein the cluster-portion observation data comprise information indicating a position of the particular charging pad, and positions of one or more fiducial markers within the portion of the ground-based cluster relative to the particular charging pad; send, via electronic transmission, the cluster-portion observation data to a computing system in an infrastructure support network for UAVs; and receive, from the computing system, via electronic transmission, location information, the location information indicating that UAV's geolocation is a geolocation of the particular charging pad.

In a second aspect, a computing system in an infrastructure support network for uncrewed aerial vehicles (UAVs) may comprise one or more processors and memory storing instructions that, when executed by the one or more processors, cause the computing system to carry out operations including: receiving, from a UAV, via electronic transmission, cluster-portion observation data derived from an aerial image of a portion of a ground-based cluster of charging pads for UAVs, the cluster comprising the charging pads arranged in a layout and a plurality of fiducial markers distributed at positions across the layout; wherein the aerial image was captured by the UAV while hovering above a particular charging pad within the portion of the ground-based cluster, and wherein the cluster-portion observation data comprise information indicating a position of the particular charging pad, and positions of one or more fiducial markers within the portion of the ground-based cluster relative to the particular charging pad; identifying at least one mapped fiducial marker in a stored reference map of the ground-based cluster that matches one of the one or more fiducial markers in the cluster-portion observation data; identifying a mapped charging pad in the reference map as a match to the particular charging pad in the cluster-portion observation data, based on the identified at least one mapped fiducial marker and its position in the reference map relative to the identified mapped charging pad; determining a geolocation and an orientation of the particular charging pad according to a recorded geolocation and orientation for the identified mapped charging pad; and sending, via electronic transmission, location information to the UAV, the location information indicating that the UAV's geolocation is the determined geolocation of the particular charging pad.

In a third aspect, a system may comprise a server in an infrastructure support network for uncrewed aerial vehicles (UAVs); a ground-based cluster of charging pads for UAVs, the cluster comprising the charging pads arranged in a layout and a plurality of fiducial markers distributed at positions across the layout; and a UAV comprising an imaging system, and a control system. The UAV control system may be configured to: cause the UAV to hover above a particular charging pad within a portion of the ground-based cluster; cause the imaging system capture an aerial image of the portion of the ground-based cluster, including the particular charging pad, while hovering above the particular charging pad; derive cluster-portion observation data from the aerial image, wherein the cluster-portion observation data comprise information indicating a position of the particular charging pad, and positions of one or more fiducial markers within the portion of the ground-based cluster relative to the particular charging pad; send, via electronic transmission, the cluster-portion observation data to the server; and receive, from the server, via electronic transmission, location information, the location information indicating that UAV's geolocation is a geolocation of the particular charging pad. The server may be configured to: receive, from the UAV, the cluster-portion observation data; identify at least one mapped fiducial marker in a stored reference map of the ground-based cluster that matches one of the one or more fiducial markers in the cluster-portion observation data; identify a mapped charging pad in the reference map as a match to the particular charging pad in the cluster-portion observation data, based on the identified at least one mapped fiducial marker and its position in the reference map relative to the identified mapped charging pad; determine the geolocation and an orientation of the particular charging pad according to a recorded geolocation and orientation for the identified mapped charging pad; and send the location information to the UAV.

In a fourth aspect, a method may be carried out by an uncrewed aerial vehicle (UAV). The method may comprise: causing the UAV to hover above a particular charging pad within a portion of a ground-based cluster of charging pads for UAVs, the cluster comprising the charging pads arranged in a layout and a plurality of fiducial markers distributed at positions across the layout; causing an imaging system of the UAV to capture an aerial image of the portion of the ground-based cluster, including the particular charging pad, while hovering above the particular charging pad; deriving cluster-portion observation data from the aerial image, wherein the cluster-portion observation data comprise information indicating a position of the particular charging pad, and positions of one or more fiducial markers within the portion of the ground-based cluster relative to the particular charging pad; sending, via electronic transmission, the cluster-portion observation data to a computing system in an infrastructure support network for UAVs; and receiving, from the computing system, via electronic transmission, location information, the location information indicating that UAV's geolocation is a geolocation of the particular charging pad In a fifth aspect, a method may be carried out by a computing system in an infrastructure support network for uncrewed aerial vehicles (UAVs). The method may comprise: receiving, from a UAV, via electronic transmission, cluster-portion observation data derived from an aerial image of a portion of a ground-based cluster of charging pads for UAVs, the cluster comprising the charging pads arranged in a layout and a plurality of fiducial markers distributed at positions across the layout; wherein the aerial image was captured by the UAV while hovering above a particular charging pad within the portion of the ground-based cluster, and wherein the cluster-portion observation data comprise information indicating a position of the particular charging pad, and positions of one or more fiducial markers within the portion of the ground-based cluster relative to the particular charging pad; identifying at least one mapped fiducial marker in a stored reference map of the ground-based cluster that matches one of the one or more fiducial markers in the cluster-portion observation data; identifying a mapped charging pad in the reference map as a match to the particular charging pad in the cluster-portion observation data, based on the identified at least one mapped fiducial marker and its position in the reference map relative to the identified mapped charging pad; determining a geolocation and orientation of the particular charging pad according to a recorded geolocation and orientation for the identified mapped charging pad; and sending, via electronic transmission, location information to the UAV, the location information indicating that the UAV's geolocation is the determined geolocation of the particular charging pad.

In a sixth aspect, a method may be carried out by an uncrewed aerial vehicle (UAV) and a server in an infrastructure support network for UAVs. The method may comprise: the uncrewed aerial vehicle (UAV) hovering above a particular charging pad within a portion of a ground-based cluster of charging pads for UAVs, the cluster comprising the charging pads arranged in a layout and a plurality of fiducial markers distributed at positions across the layout; the UAV capturing an aerial image of the portion of the ground-based cluster, including the particular charging pad, while hovering above the particular charging pad; the UAV deriving cluster-portion observation data from the aerial image, wherein the cluster-portion observation data comprise information indicating a position of the particular charging pad, and positions of one or more fiducial markers within the portion of the ground-based cluster relative to the particular charging pad; the UAV sending, via electronic transmission, the cluster-portion observation data to the server. The method may further comprise: the server receiving, from the UAV, the cluster-portion observation data; the server identifying at least one mapped fiducial marker in a stored reference map of the ground-based cluster that matches one of the one or more fiducial markers in the cluster-portion observation data; the server identifying a mapped charging pad in the reference map as a match to the particular charging pad in the cluster-portion observation data, based on the identified at least one mapped fiducial marker and its position in the reference map relative to the identified mapped charging pad; the server determining a geolocation and an orientation of the particular charging pad according to a recorded geolocation and orientation for the identified mapped charging pad; the server sending, via electronic transmission, location information to the UAV, the location information indicating that the UAV's geolocation is the determined geolocation of the particular charging pad. The method may still further comprise the UAV receiving, from the server, the location information.

In a seventh aspect, a non-transitory computer-readable medium may store instructions that, when executed by one or more processors of an uncrewed aerial vehicle (UAV), cause the UAV to perform operations corresponding to the method carried by a UAV, as described above.

In an eighth aspect, a non-transitory computer-readable medium may store instructions that, when executed by one or more processors of a computing system in an infrastructure support network for uncrewed aerial vehicles (UAVs), cause the system to perform operations corresponding to the method carried out by a computing system, as described above.

In a ninth aspect, a non-transitory computer-readable medium may store instructions that, when executed by one or more processors of a system comprising (i) a server in an infrastructure support network for uncrewed aerial vehicles (UAVs) and (ii) a UAV, cause the system to perform operations corresponding to the method carried out by a UAV and a server, as described above.

These, as well as other aspects, advantages, and alternatives, will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 4D illustrates an example charging pad cluster with example fiducial markers as viewed from different hypothetical perspectives, in accordance with example embodiments.

FIG. 7A is a conceptual illustration of example operations of collection aerial observations of a ground-based assets by a UAV, sending the aerial observations to a server in a UAV ground-support system, and asset tracking by an asset manager in the UAV ground-support system, in accordance with example embodiments.

FIG. 7B depicts examples of certain data structures and formats, in accordance with example embodiments.

FIG. 11 is a block diagram of a method, in accordance with example embodiments.

DETAILED DESCRIPTION

Figure 1A:
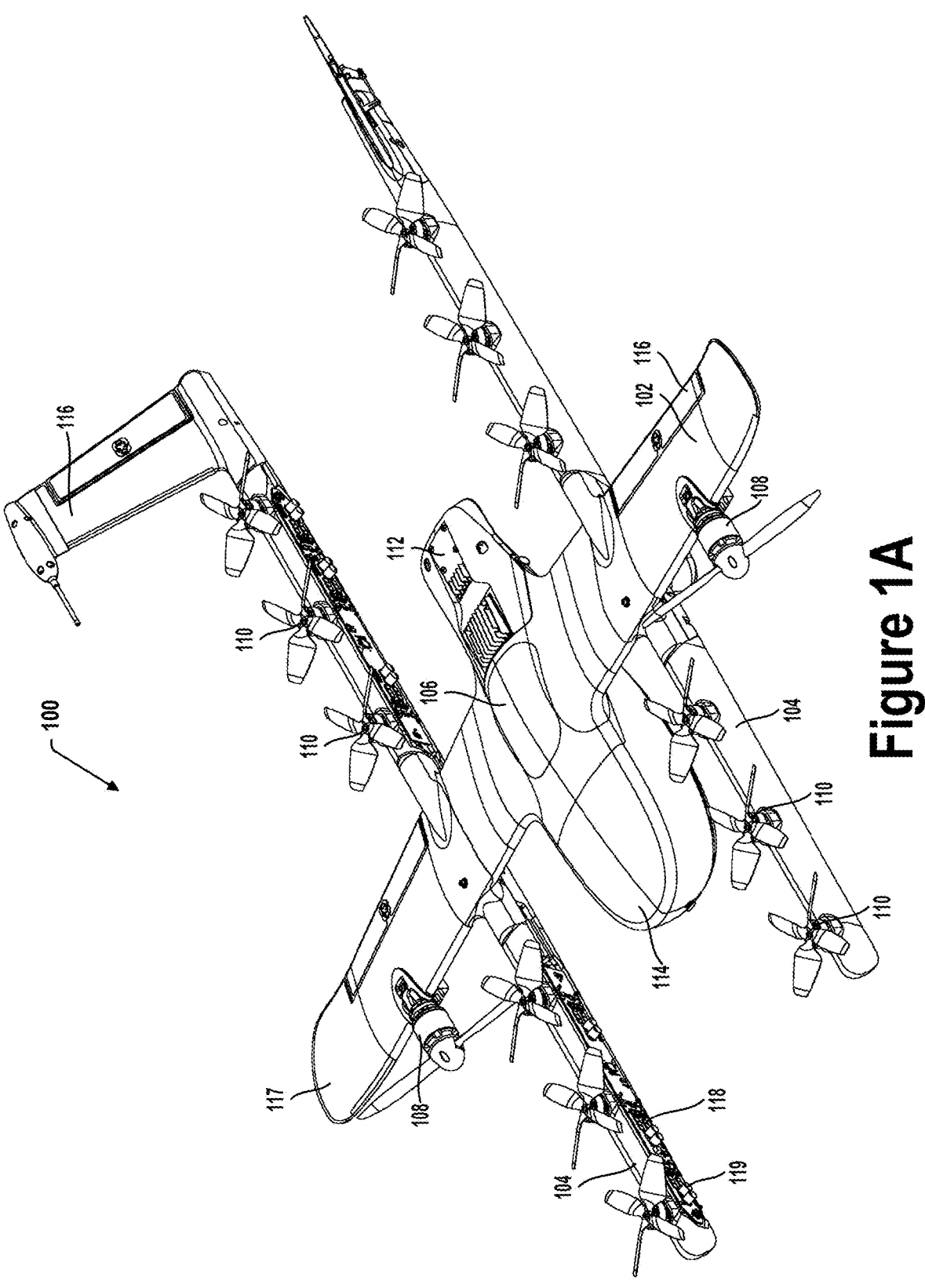
FIG. 1A is a simplified illustration of an uncrewed aerial vehicle, according to example embodiments, in accordance with example embodiments.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

An example usage of UAVs may be to deliver various items to customers. For example, UAVs may be tasked with picking up a payload containing an item from a location and delivering the payload to a customer's residence, commercial building, or other location. In a typical usage scenario a group or fleet of UAVs may be deployed by a fleet operator to provide a delivery service for its own product offerings and/or for other vendors. A fleet of UAVs may be used for additional and/or other services, such as environment surveillance and emergency services support, among other non-limiting examples. The tasks associated with services provided by a fleet of UAVs may sometimes be referred to herein as "missions," a term meant to convey that a set of operational steps that may be involved in carrying out a task, such as delivery.

In order to support a fleet of UAVs in their missions, as well as support the service or services provided by the fleet, a fleet operator may also deploy an infrastructure. As described in detail below, such an "infrastructure support network," as it is sometimes referred to herein, may include servers and computing systems for managing mission operations, coordinating UAV tasks, interfacing with customers (or other service recipients), and maintaining fleet health and readiness. In accordance with example embodiments, the infrastructure may be implemented in a centralized and/or distributed fashion, and may be organized hierarchically. Infrastructure may also include and or be connected with one or more communications networks, such as a public and/or private internet, for supporting communications between other infrastructure elements.

One aspect of maintaining fleet health and readiness may entail charging batteries of individual UAVs. In accordance with example embodiments, battery charging may be implemented using large-scale deployments of charging pads arranged in groups or clusters located at various sites across an operating region, such as a city or metropolitan area. For example, each vendor using a UAV delivery service may host a cluster of 10-50 or more charging pads at each of its vendor sites. Each cluster may be powered by available AC (alternating current) power, and be relatively inexpensive to operate, incurring only electric utility fees for intermittent usage, for example. Charging pads may also serve as origination points and/or termination points of UAV missions and/or mission legs (or segments), such as delivery pick-up and/or drop-off points.

In accordance with example embodiments, charging pad clusters may be deployed as standalone sites and/or integrated with additional infrastructure elements or components for supporting other aspects of UAV fleet operation. For example, an aspect of mission operations may involve collecting and processing/analyzing various forms of operations reporting data from UAVs accumulated during missions, and providing various forms of operations configuration data to UAVs. Thus, infrastructure facilities for bulk data transfers between UAV and fleet support systems may include a wireless access point communicatively connected to a wireless and/or wireline broadband interface to a data backhaul network, such as a data/telecommunications carrier core network and/or internet. The data backhaul network may then be communicatively connected to servers and computer systems of the fleet support infrastructure. A UAV may communicate via a wireless connection with the wireless access point. In some instances, a UAV may have its own cellular wireless interface to a cellular data and telecommunications network.

Such "full-service" operations support facilities are sometimes referred to as "jet bridges," in analogy to like-named facilities where commercial aircraft typically park at airport terminals. Thus, a jet bridge may provide one or more charging pads, as well as a communicative connection to an infrastructure support network. An infrastructure support network may include one or more servers that support flight scheduling, flight plans, and mission plans, for example. Jet bridges and/or standalone charging pad clusters may be deployed at warehouses, retail shopping centers, and/or other facilities that may be served by UAVs and/or support UAV operations.

A UAV may have a navigation system that provides a relatively coarse mode of navigational accuracy to enable the UAV to achieve, with a specified likelihood of navigational success, flying to within a threshold tolerance of a designated target location. The coarse mode of navigation may use GPS, for example, which could have limited and/or impeded accuracy in some circumstances. In an example usage scenario, the designated target location may be a designated target charging pad within a cluster of charging pads arranged in a grid or other layout, and the specified likelihood and threshold tolerance may be such that the UAV may have a non-vanishing likelihood of arriving at the wrong charging pad. The UAV navigation system may also provide a fine mode to augment its coarse navigational solution in order to be able to distinguish the correct, designated target charging pad from among other nearby pads that may be within the threshold tolerance. More particularly, in example embodiments a cluster of charging pads may include a distribution of fiducial markers at various positions and orientations relative to the charging pads that may be recognized by a UAV and used to achieve the requisite disambiguation.

In an example usage scenario, a UAV may have a mission that includes flying to and (possibly) landing on a designated charging pad in a cluster of charging pads. The UAV may be provided with a reference map of the cluster, including the fiducial markers. The reference map may represent a view of the cluster from above in which the spatial distribution of fiducial markers in the vicinity of any given charging pad form a sort of reference constellation or pattern that is distinguishable from similarly-formed reference constellations in the vicinities of other charging pads of the cluster. The UAV may thus use its coarse navigation mode to fly to and arrive at a coarse-navigation position within the threshold tolerance of the designated target charging pad, and then use an imaging system to acquire an image of the cluster from its perspective at the coarse-navigation position and orientation. The UAV may identify one or more observed charging pads in the image, as well as corresponding observed constellations of fiducial markers for each of the one or more observed charging pads. By applying one or another form a pattern matching operation to one or more of the observed constellations and one or more of the reference constellations in the reference map, the UAV may then distinguish or disambiguate between the identities or cluster positions of the one or more observed charging pads. In particular, the UAV may use the disambiguation to identify the designated target charging pad and/or disqualify a different observed charging pad that might otherwise be misidentified as the designated target charging pad.

In some deployments, the charging pads of a cluster may be arranged in a layout, such as a regular grid or array. In accordance with example embodiments, by using constellations of fiducial markers at their respective relative positions and orientations with respect to charging pads of a cluster, the fiducial markers need not necessarily be deployed at precise geolocations and/or have precisely determined geolocations. In some examples, the distribution and orientations of fiducial markers at locations across a cluster may be random and/or regular. Additionally, a match between a reference constellation and an observed constellation need not necessarily be exact in order to confirm or disqualify an identification. Thus, this technique may tolerate some degree of discrepancy between a reference map of a cluster and the actual distribution of fiducial markers observed or captured in the UAV's image. Discrepancies could result from damage to, and/or debris on, one or more fiducial markers, for example. Some discrepancies may result, at least in part, simply from misalignment between observed and reference constellations. Straightforward geometric transformations (e.g., rotations and/or translations) may be applied to compensate for such misalignments (or other differences of perspective between observed and reference constellations).

Further, to the extent that the fiducial markers may be identified by visibly (or otherwise) recognizable physical features, all of the fiducial markers of a cluster need not necessarily have unique identifications in order for different constellations to be distinguishable. Thus, by using recognizable constellations of fiducial markers to disambiguate among charging pads, charging pad clusters including fiducial markers may be deployed without necessarily requiring determination of precise geolocations of pads or fiducial markers, or necessarily requiring unique identifications among fiducial markers of the cluster. As a resulting benefit, it may also be possible to reduce the need for on-site maintenance of fiducial markers compared to what might otherwise be required.

Because constellations or patterns of fiducial markers with respect to charging pads of a cluster derive from relative positions and orientations of the fiducial markers with respect to the charging pads, and do not necessarily depend on precise geolocations of the fiducial markers, the term "context-based navigation" may be used to describe the techniques and methodology of example embodiments herein. That is, recognizable patterns of fiducial markers may provide a context for positional and orientational awareness of a UAV with respect to specific charging pads of a cluster that does not necessarily require a determination of either the UAV's precise geolocation, or of the fiducials of a cluster.

As described, context-based navigation by UAVs, using observed relative positions of fiducial markers and charging pads, is supported in part by reference maps of charging clusters provided by a UAV ground-support system. Because charging pad clusters may be deployed without necessarily requiring determination of precise geolocations of pads or fiducial markers, or necessarily requiring unique identifications among fiducial markers of the cluster, generation of reference maps of charging pad cluster may not be able to rely on or assume availability of precise geolocations of ground-based assets (e.g., charging pads and fiducials). Accordingly, the inventors have devised techniques for generating reference maps that utilize aerial observations of apparent positions of assets in clusters by one or more UAVs. Advantageously, these techniques not only enable creation of reference maps well-suited for context-based navigation to be generated from specific survey, as well as routine aerial, observations by UAVs, without having or needing precise geolocation measurements of ground-based assets of clusters, but the techniques also allow routine monitoring of clusters for changes-both intentional and unintentional—in asset configurations. The routine monitoring may then be used to routinely update reference maps to keep them current for context-based navigation, and to detect configuration changes that may indicate cluster-site problems and/or require some form of on-site maintenance.

In accordance with example embodiments, reference maps of a cluster may be generated by a server or other processing system from aerial observations obtained from planned or incidental flights of UAVs over a locale of the cluster. For example, one or more UAVs may have missions that include acquiring aerial observations (e.g. images) of one or more clusters from various positions and perspectives above the clusters. UAVs may analyze image data to recognize charging pads and fiducials, and determine vector positions of the recognized assets with respect to the respective geolocations of the UAVs at the time of image capture. The UAVs may then construct aerial observation data including the vector positions and the measurements of the UAVs' positions and orientations, and transmit the aerial observation data to a server in an infrastructure support network for UAVs. The server (or servers) may use the observation data to construct a map graph of the cluster assets, and then apply an analytical optimization of the map graph in order generate a reference map of the cluster.

In accordance with example embodiments, reference map generation may be part of a system configured for tracking of ground-based assets of charging pad clusters. Non-limiting examples of ground-based assets include charging pad and fiducials of charging pad clusters of a UAV ground-support system. In further accordance with example embodiments, asset tracking may include an asset manager server for carrying out operations and computations of asset tracking and reference map generation and maintenance, and an associated asset database for storing reference maps of known clusters and records of known assets, among other possible information.

In further accordance with example embodiments, an asset manager may be configured to receive aerial observation data from one or more UAVs of one or more charging pad clusters. From time to time, the asset manager may thus use the received aerial observation data to generate a map of one or more clusters. When the asset manager generates a reference map for a previously known and recorded cluster, the newly-generated map and any existing map for the cluster may be compared. In this way, cluster maps may be updated as deemed necessary, and/or cluster-site changes of consequence may be detected or discovered. If a first-time map is generated for a new cluster, the new map may be added to the tracking system.

Also in accordance with example embodiments, generation of new and/or updated reference maps may yield identifications and positions of the assets contained in the maps. This information for each given asset may then be used to update a record for the given asset if it has been previously recorded, or create a new asset record if the given asset was not previously known or recorded.

In further accordance with example embodiments, updating maps and assets may include adjusting the position of an asset in a map, adding a new asset to an existing map, or deleting an asset from an existing map. Other forms of updates may be performed as well.

By having UAVs process/analyze image data and effectively distill it down to UAV aerial geolocations and vector positions of assets, aerial observation data may be rendered relatively small in size. Advantageously, this may allow UAVs to send aerial observation data to the server using relatively small cellular transmissions, and thus relatively low cost in bandwidth usage, transmission time, and monetary expense.

When a UAV first powers on, various of the UAV's operating systems and devices may need to undergo initializations and health and safety checks in order to bring the UAV into a flight-ready operational state. This may include verifying battery charge and flight-control systems, among other functions. In addition to operational readiness, a UAV's initial location and orientation may need to be known to some specified degree of accuracy in order to calibrate its navigation system and to support mission planning. But the UAV's geolocation and orientation may be indeterminate at power-on, except possibly for a general operational convention of the UAV initially residing within one of numerous ground-support facilities that include multiple take-off/landing platforms. In some examples, the take-off/landing platform may be a charging pad in a cluster of charging pads. Even with a presumption that a UAV powers on from a charging pad cluster, however, neither the UAV nor a UAV support system may necessarily know which of numerous charging pads of a given cluster the UAV is on, and/or even which of numerous clusters the UAV is at, when it powers on.

One technique for determining a UAV's geolocation at power-up is to use a GPS system. While this can work in principle, in practice GPS satellite signals received at ground level, where a UAV may be positioned when it powers on, may be subject to direct path and/or multipath interference, or other forms of signal degradation, that can reduce the accuracy of GPS-based geolocation determination below what may be needed for proper navigation system calibration and mission flight planning. GPS signal degradation may be mitigated or overcome by causing the UAV to ascend vertically from its initial power-up position to a sufficiently high altitude where there is little or no interference. For example, at approximately 20 m altitude above ground level ("AGL") or higher, a UAV may be able to receive a clear enough and strong enough GPS signal to determine its geolocation to within approximately three meters accuracy. However, an aerial vehicle at 20 m ALG may be subject to aviation regulations or other flight or regulatory considerations that may incur costs and/or introduce operational complexities. Thus, it would be desirable to be able to determine the initial location of a UAV at power-up without needing to rely on an AGL that enables adequate GPS geolocation, but that might also trigger regulatory and/or operational considerations.

Accordingly, the inventors have devised techniques for using a low-altitude initial vertical flight of a UAV upon power-up to both initialize its operational state, and to acquire one or more images of the UAV's launch point and a relatively restricted area surrounding it. For UAV launch from a charging pad in a cluster, the restricted area could be just a portion of the cluster that includes the charging pad and one or more fiducials. By way of example, a low-altitude initial vertical flight may be in a range of 1-5 m AGL. The UAV may process one or more images into a form of observational data that effectively distills information descriptive of the charging pad and the one or more fiducials, and then transmit the observational data to a server or computer system in a UAV ground-support network for analysis configured to identify specific clusters and pads from the distilled information. By doing so, the server may thus identify the UAV's launch pad and, from the identification, determine, to a threshold accuracy, the UAV's initial geolocation and orientation. Advantageously, the identification and determination may be made using UAV observations obtained prior to location calibration of the UAV.

The server may then use the determined geolocation and orientation of the UAV to devise a mission plan for the UAV, and to provide the UAV with the position/orientation determination, thereby enabling the UAV to calibrate its navigation system in preparation for flight. The UAV may also confirm the accuracy of the determined position/orientation determination upon ascending to a cruising or mission AGL from which it may check its calibrations against a GPS position/orientation determination. The UAV and/or server may take one or more corrective actions if the UAV finds greater than a threshold disagreement between the server-based determination and GPS-based determination.

Further details and advantages of example embodiments are described below.

II. Example Uncrewed Vehicles

Herein, the terms "uncrewed aerial vehicle" and "UAV" refer to any autonomous or semi-autonomous vehicle that is capable of performing some functions without a physically present human pilot. As noted above, the term "unmanned" may sometimes be used instead of, or in addition to, "uncrewed," and it should be understood that both terms have the same meaning, and may be used interchangeably.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "uncrewed aerial vehicle system" (UAVS), or "uncrewed aerial system" (UAS) may also be used to refer to a UAV.

FIG. 1A is an isometric view of an example UAV 100. UAV 100 includes wing 102, booms 104, and a fuselage 106. Wings 102 may be non-flying stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
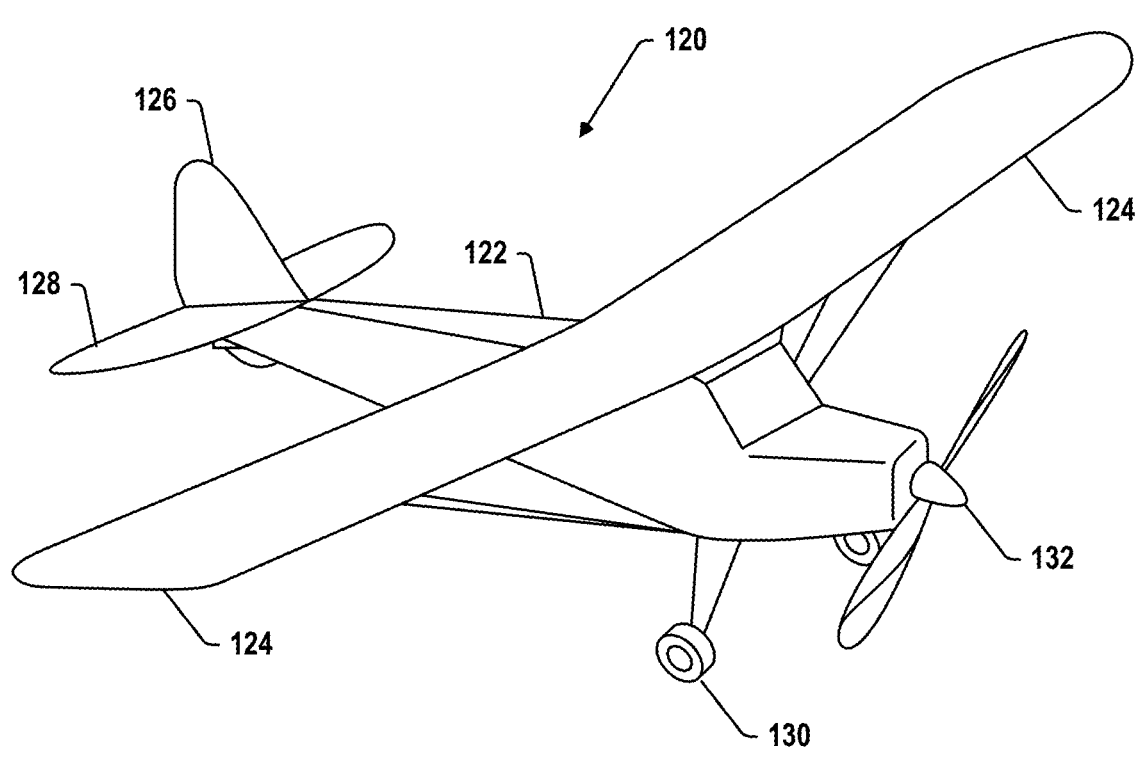
FIG. 1B is a simplified illustration of an uncrewed aerial vehicle, according to example embodiments, in accordance with example embodiments.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
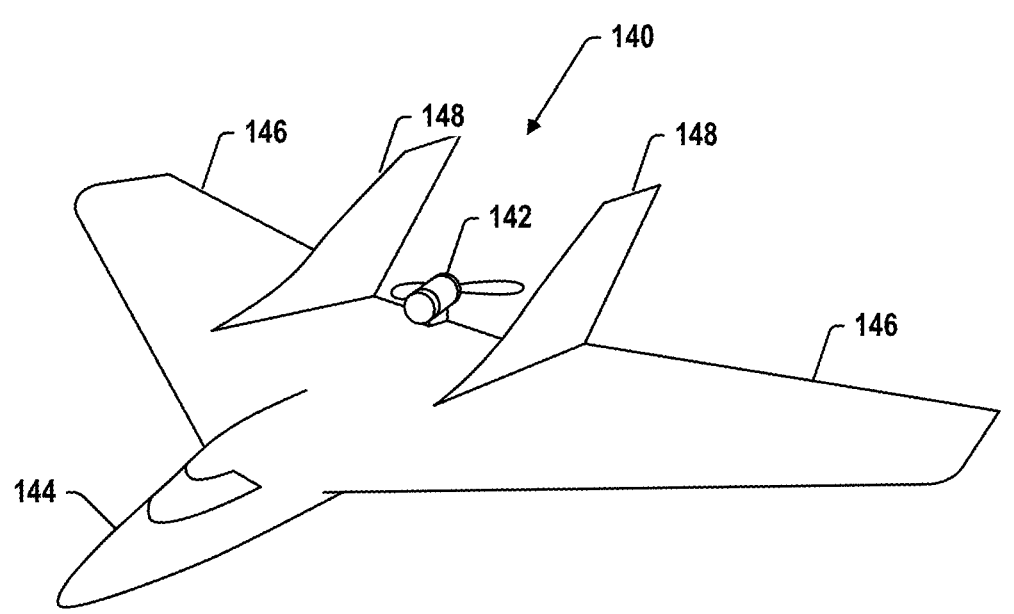
FIG. 1C is a simplified illustration of an uncrewed aerial vehicle, according to example embodiments, in accordance with example embodiments.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
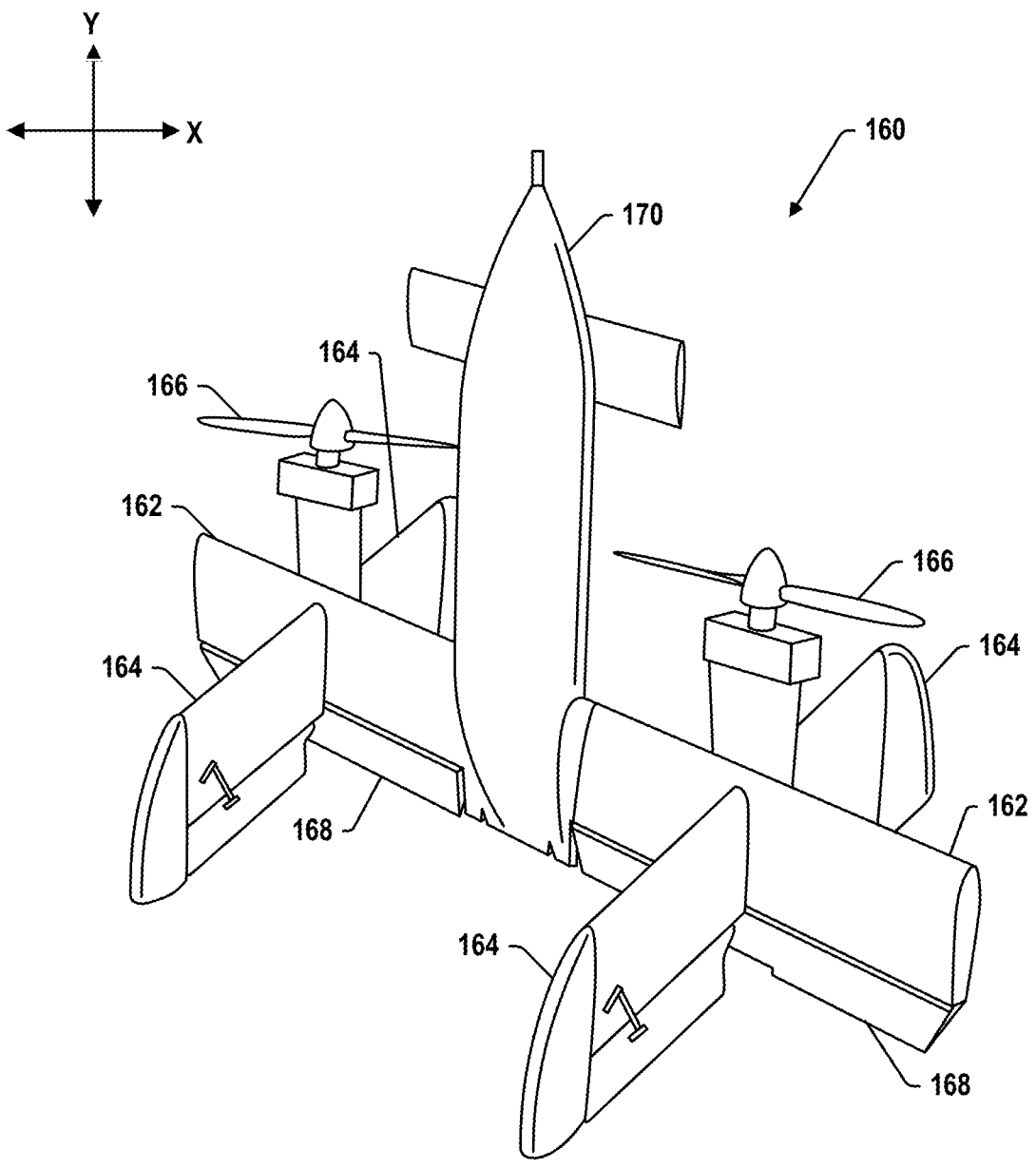
FIG. 1D is a simplified illustration of an uncrewed aerial vehicle, according to example embodiments, in accordance with example embodiments.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
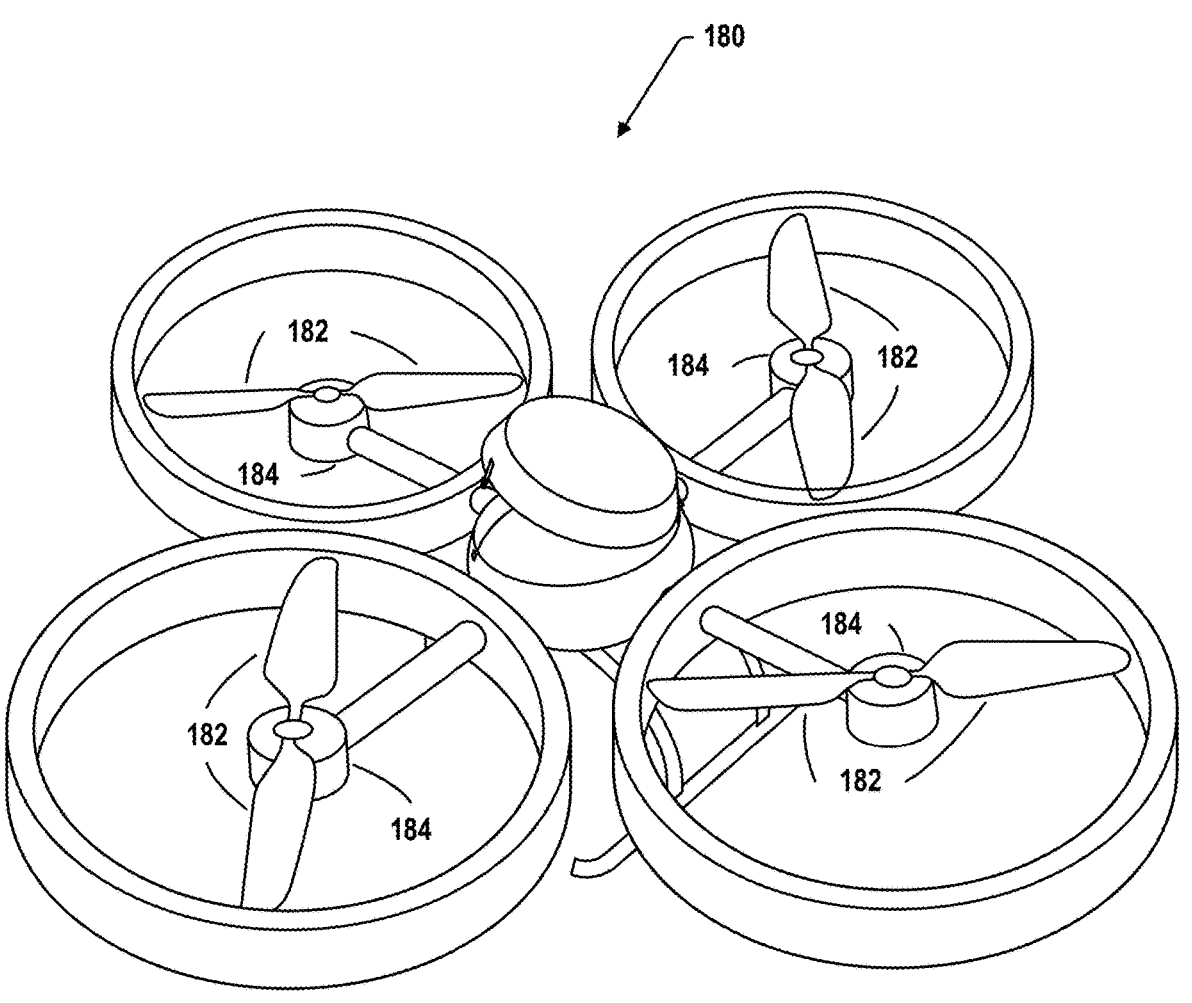
FIG. 1E is a simplified illustration of an uncrewed aerial vehicle, according to example embodiments, in accordance with example embodiments.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well.

Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "uncrewed" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of uncrewed aerial vehicle.

III. Illustrative UAV Components

Figure 2:
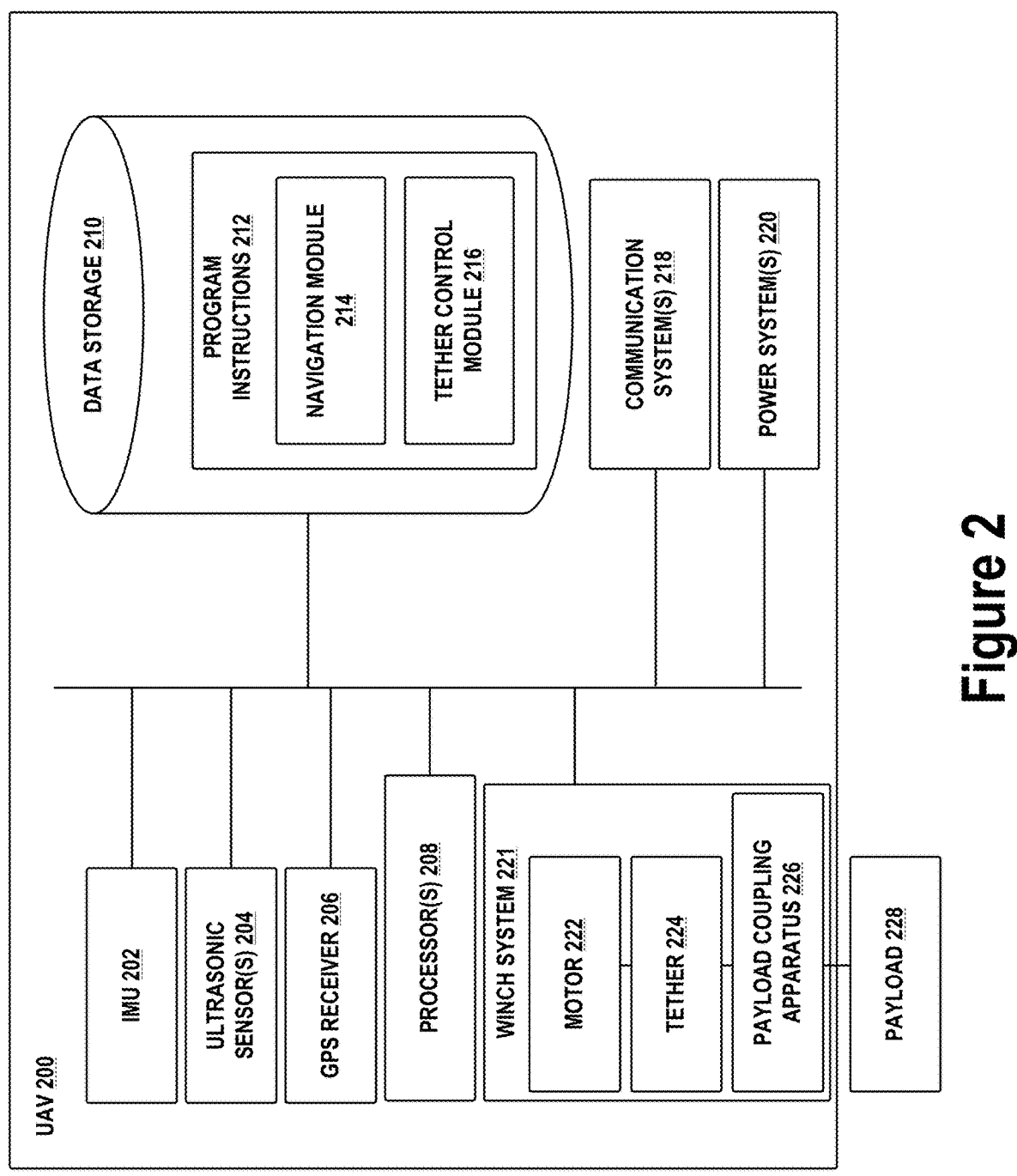
FIG. 2 is a simplified block diagram illustrating components of an uncrewed aerial vehicle, in accordance with example embodiments.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for uncrewed vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with uncrewed vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine latitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may include one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In some embodiments, the package may include various features that protect its contents from the environment, reduce aerodynamic drag on the system, and prevent the contents of the package from shifting during UAV flight. In other embodiments, the package may be a standard shipping package that is not specifically tailored for UAV flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload retriever 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload retriever 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operation specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload retriever 226 is pressing against the UAV 200 after retracting the tether 224. Other examples are possible as well.

During delivery of the payload 228, the payload retriever 226 can be configured to secure the payload 228 while being lowered from the UAV by the tether 224, and can be further configured to release the payload 228 upon reaching ground level. The payload retriever 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. Illustrative UAV Deployment Systems

Figure 3:
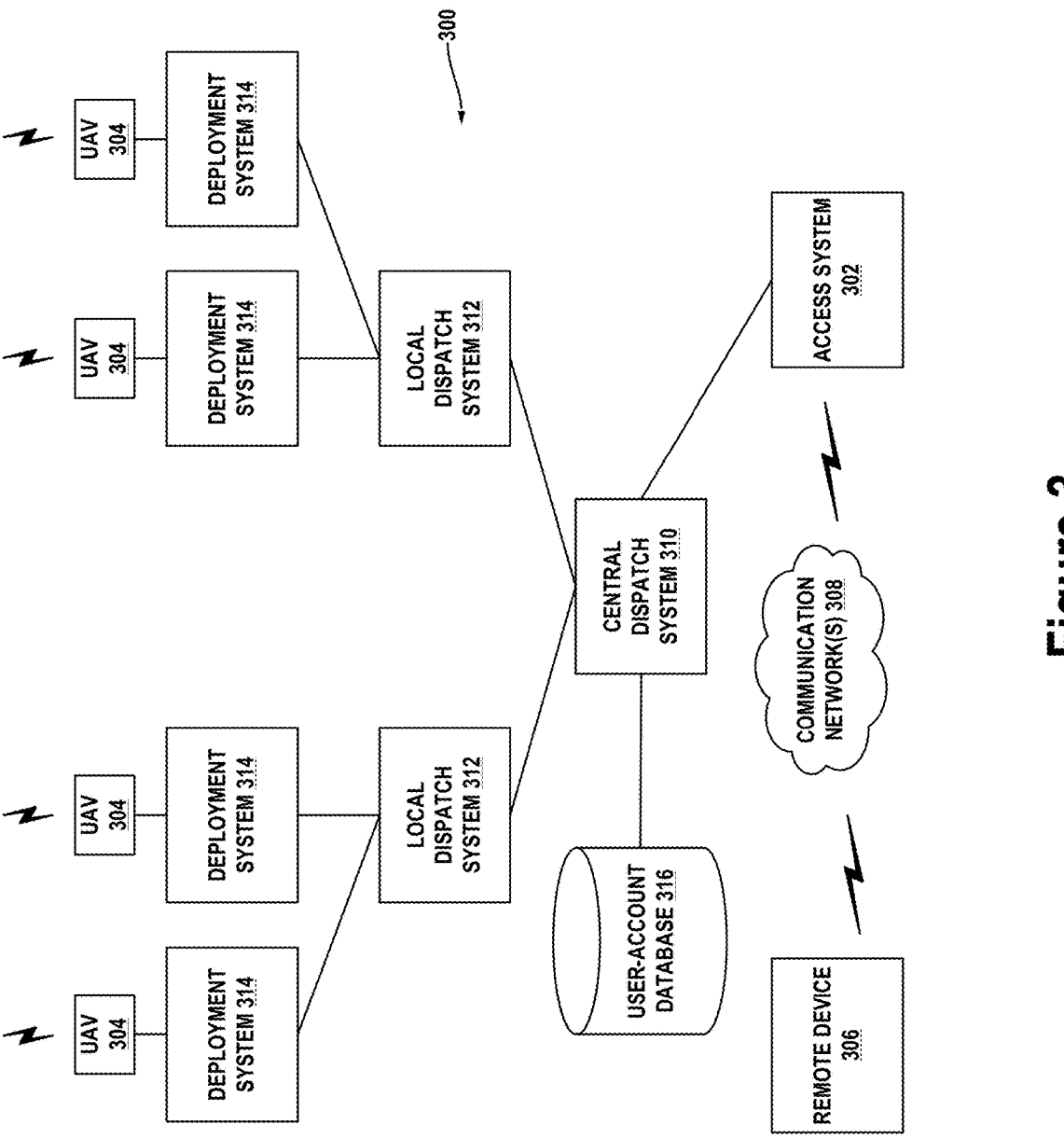
FIG. 3 is a simplified block diagram illustrating a UAV system, in accordance with example embodiments.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more persons. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. Example Operation of Context-Based Navigation of UAVs Using Relative-Position Patterns of Fiducial Markers Context-based navigation of UAVs using patterns or constellations of fiducial markers may be described by way of example operation by considering a UAV flying to a designated target charging pad among a cluster of charging pads. In an example usage scenario, such a UAV may have a mission that includes (among possibly other actions) flying to and landing on the designated target charging pad. The example operation, described below, is not intended to be limiting with respect to the scope of example embodiments described herein.

The UAV system 300 illustrated in FIG. 3 is an example of a support infrastructure described briefly above in connection with battery charging pads and mission and operations support. In connection with these and other aspects of UAV fleet operation, the deployment system(s) 314 of FIG. 3 may be considered a jet bridge. More particularly, the deployment system(s) 314 may function as launching and landing sites or platforms for UAVs, and, as shown, may also be communicatively connected with other components of the infrastructure, including those which may support mission operations and data processing/analysis. As such, a deployment system 314 may provide a variety of support operations for UAVs, including communications with network-based servers and other infrastructure elements. Deployment system(s) 314 may also include clusters of charging pads.

Although not necessarily shown as distinct infrastructure entities in FIG. 3, charging pad clusters may also be deployed as standalone configurations. In accordance with example embodiments, a standalone charging pad cluster may include a layout of charging pads connected to AC power, and possibly configured to function as little more than landing pads or platforms with battery charging facilities. In practice, charging pad clusters may be located at delivery pick-up sites, such as vendors' warehouses or retail stores, for example. UAVs may be controlled and/or pre-programmed to visit such sites to retrieve items for delivery, and to charge their batteries during their stopovers, but may not necessarily need any other services during each such stop.

Figure 4A:
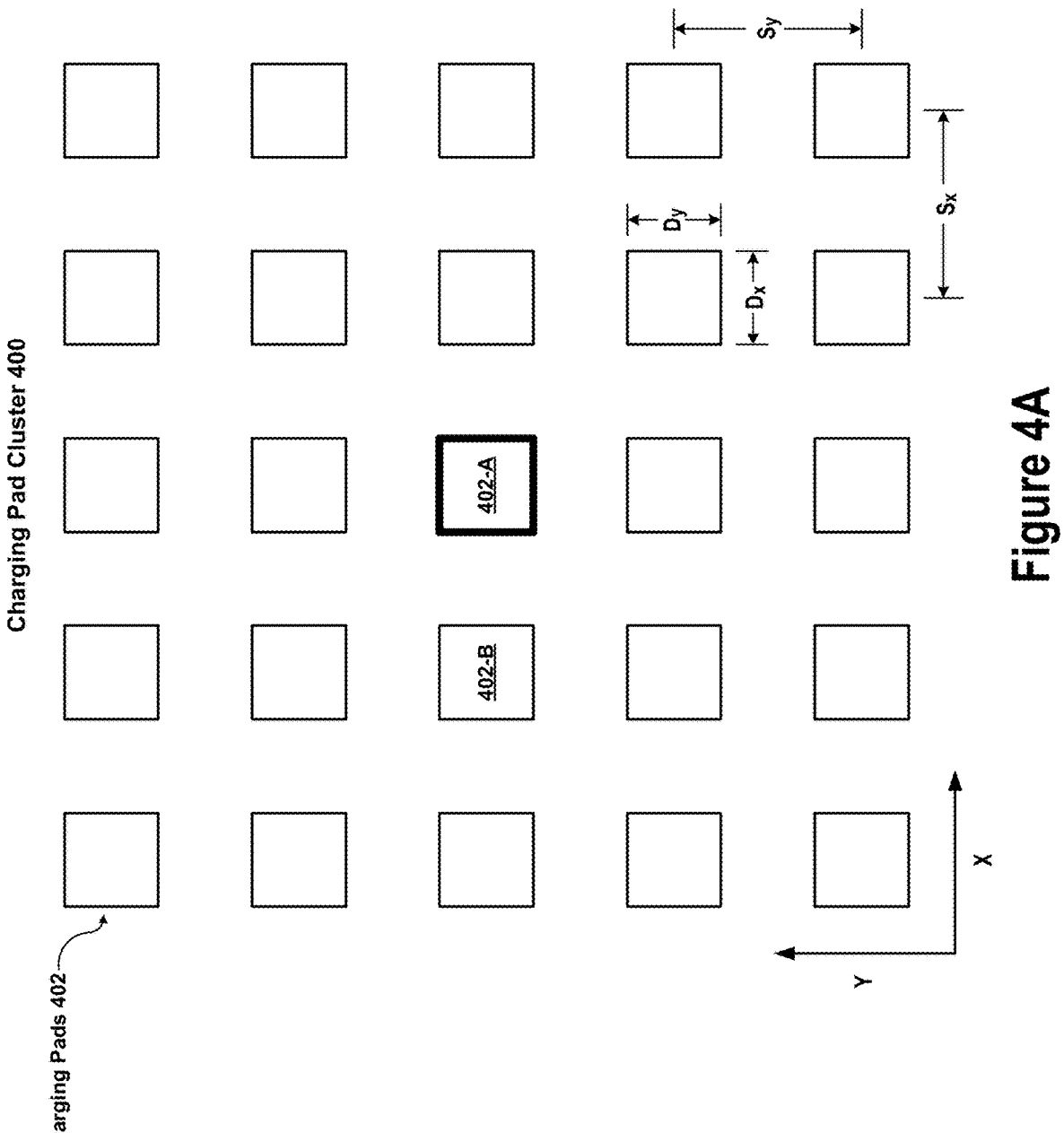
FIG. 4A illustrates an example charging pad cluster, in accordance with example embodiments.

FIG. 4A illustrates an example charging pad cluster 400, in accordance with example embodiments. In the illustration, charging pads 402 are represented by squares at regular positions in a square grid (or array) having five charging pads on each side for a total of 25 charging pads. As mentioned above and discussed in more detail below, a charging pad cluster may also include a plurality of fiducial markers at positions distributed across the layout (e.g., grid) of charging pads. For the moment, fiducial markers are omitted from the depiction of charging pad cluster 400 in FIG. 4A. However, a distribution of fiducial markers will be depicted in a subsequent figure (see FIG. 4D) and discussed in connection therewith.

Continuing with FIG. 4A, axes labeled "X" and "Y" at the lower left of the grid represent a coordinate system for the grid. By way of example, all the charging pads are oriented with their sides parallel to the axes. For purposes of the discussion here, two of the charging pads are distinctly labeled 402-A and 402-B. Also by way of example, all the charging pads 402 are identical in size, having dimensions of $D_x$ and $D_y$, as shown. As also shown, the center-to-center separation of the charging pads is $S_x$ in the X-direction and $S_y$ in the Y-direction. And again by way of example, the X and Y separations are equal ($S_x = S_x$). In the discussion of example operation below, charging pad 402-A serves as an example designated target charging pad for a UAV, so it is depicted with a thick black line as a visual cue of its special role in the discussion.

It should be understood that other configurations of charging pads in a cluster are possible as well. For example, the layout need not necessarily be square or even regular, and the orientation of the charging pads need not necessarily be identical or aligned with the sides of a grid. Further, a cluster need not necessarily include only identically-sized charging pads. For the purposes of the present discussion, however, there is no loss in generality by considering a cluster of identically-sized, square (or rectangular) charging pads configured at regular positions in a square (or rectangular) grid, and all oriented parallel to the sides of the grid. Non-limiting examples of dimensions of an example embodiment of charging pad cluster 400 include $D_x = D_y = 1.2$ meters (4 feet), and $S_x = S_y = 3$ meters (9.8 feet). Note that the charging pad cluster 400 in FIG. 4A is not necessarily to scale.

For purposes of the discussion herein, the vicinity of a charging pad cluster will be referred to as its "locale." Non-limiting examples of a locale of a charging cluster may be a warehouse in which, or adjacent to which, the charging pad cluster is located. Other terms similar to "locale" may also be used to convey its meaning as applied herein, such as "locality," "region," and "site," among others.

In an example operational scenario such as the one described above, a UAV may intend or be instructed (e.g., according to a mission flight plan) to fly to and land on a designated target charging pad—for example, charging pad 402-A of charging cluster 400. The specification of a designated target charging pad from among a cluster may be related to particular operational protocols of a fleet of UAVs. For example, coordination of multiple flight plans of multiple UAVs of a fleet may call for or require advanced assignments of designated charging pads for landing. There could be other or additional reasons as well.

In an example embodiment, the UAV may be configured for both flying predominantly horizontally between different geolocations, and ascending, descending, and hovering vertically over any particular location on the ground. For purposes of the discussion herein, it may be assumed that in flying from ground-point "A" to ground-point "B," a UAV may ascend vertically from ground-point A, fly predominantly horizontally to a point vertically above ground-point B, then descend to land at ground-point B. Further, the UAV may need to confirm that it has correctly identified ground-point B before descending to land there, and the UAV may possibly adjust its horizontal position if necessary first. However, it should be understood that while the vertical ascent, descent, and hovering operations may be useful and/or helpful in describing and illustrating example operation, they are not necessarily required aspects of example embodiments. In particular, the example operation described below may be adapted to accommodate UAVs that take off and land using runways, similarly to commercial airplanes, for example.

The UAV, such as UAV 200, may have a navigation system, as described above, and may use the navigation system when flying to the locale of charging cluster 400. Although not necessarily shown in FIG. 2 or explicitly described in the associated discussion, the navigation system may be configured to operate in more than one mode. In particular, and in accordance with example embodiments, the navigation system may be configured to operate in at least a "coarse-navigation" mode and a "context-based fine-navigation mode," or just "context-based" navigation mode.

In accordance with example embodiments, the coarse-navigation mode may enable the UAV to fly to a location that is within a tolerance of a desired or designated location, so as to arrive at a "coarse-navigation" position or location. The coarse-navigation position may be vertically above an approximate ground position of the designated target charging pad, but insufficiently accurate for the UAV to distinguish its designated target charging pad from one or more other nearby (e.g., neighboring) charging pads. The UAV may then use (e.g., switch to) the context-based navigation mode, which enables the UAV to distinguish its designated target charging pad from the other nearby charging pads based on a comparison of observed constellations of fiducial markers relative to the charging pads with known reference constellations in a reference map of the charging pad cluster 400. The UAV may then descend and land on its designated target charging pad once it confirms it has correctly identified its designated pad.

In an example, the coarse-navigation mode may use a GPS system. Such a system may be subject to limitations of accuracy due to inherent operational factors and/or environmental factors that may degrade or diminish a received GPS signal, for example. Inherent limitations on accuracy could correspond to best-case accuracy or accuracy under best practical environmental and/or operational conditions. Environmental factors could be dependent on the locale of the charging cluster or particular locations within the locale, for example. In practice, environmental factors could affect the likelihood that a given degree of inherent accuracy will be achieved on any given flight. However, the likelihood could also include random factors as well. In any case, in using the coarse-navigation mode to fly to the locale, the UAV may thus arrive to within the tolerance of charging pad 402-A with a given likelihood. This may be expressed as the UAV having a "Q" percent chance of arriving to within "R" meters of a position directly above the designated target charging pad.

Figure 4B:
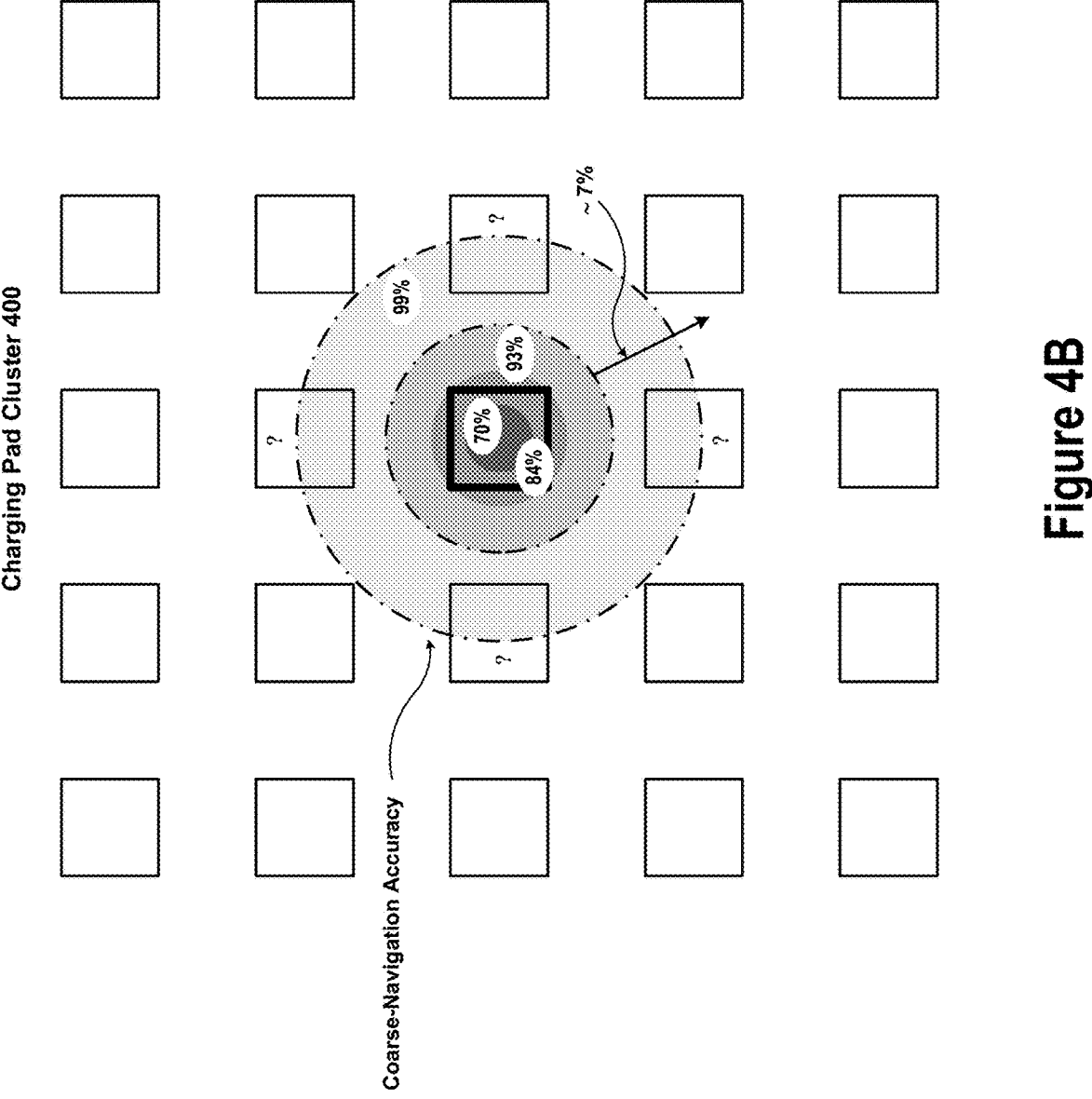
FIG. 4B is a representation of nominal UAV navigational accuracy in relation to an example charging pad cluster, in accordance with example embodiments.

FIG. 4B is a conceptual illustration of a coarse-navigation position with respect to charging pad 402-A of charging pad cluster 400, in accordance with example embodiments. In this illustration, a few different tolerances ("R" in the expression above) of distance from a center point of charging pad 402-A as viewed from above are represented as concentric rings of grayscale, and the associated likelihoods ("Q" in the expression above) are indicated as percentages within the tolerances. Taking an example in which R is normally distributed, Q=99% could be interpreted as a 3σ ("3-sigma") statistic. An example 3σ tolerance is indicated by a dashed-dotted circle labeled "Coarse-Navigation Accuracy." For illustrative purposes, and by way of example, the 3σ tolerance is taken to be approximately 3 meters. That is, a UAV using its coarse-navigation mode to fly to charging pad 402-A may be expected to arrive within 3 meters of a position above charging pad 402-A with a 99% likelihood. In this example illustration, it also appears that the UAV may be expected to arrive within approximately 1.5, 1.0, and 0.5 meters with approximately 93%, 84%, and 70% likelihoods, respectively. These likelihoods simply express integrals of a normal distribution having σ=1 meter. Note that the concentric rings of grayscale in FIG. 4B are not necessarily to scale.

It should be understood that the example tolerances and likelihoods above are largely hypothetical, and presented for illustrative purposes. Similarly, the assumption of a normal distribution of coarse-navigation arrival locations is also presented by way of example. In some implementations, the actual values and distributions could be different, though the example values might not be unreasonable estimates of actual values that may be found in practice. Putting aside the hypothetical nature of the tolerances and likelihoods above, FIG. 4B serves to illustrate that there is a degree of approximation of the coarse-navigation position and a resulting potential for mis-identification of a designated target charging pad.

Operationally, when a UAV arrives at, or as the UAV is approaching, a charging pad cluster, the UAV may initially identify a charging pad closest to a point below its coarse-navigation arrival position as a "best guess" (or "candidate") for the designated target charging pad. FIG. 4B also depicts a dashed-dotted circle at 1.5 meters, with a diagonal arrow labeled "~7%" indicating a likelihood that a coarse-navigation arrival position will be at or beyond this circle. Since 1.5 meters marks roughly a half-way point between charging pad 402-A and its immediate neighboring charging pads (e.g., charging pad 402-B), a UAV arriving at a coarse-navigation position beyond the 1.5 meters circle may be subject to mis-identifying a neighboring charging pad as charging pad 402-B, if identification is based solely on the closest charging pad to the UAV's coarse-navigation arrival position. The questions mark ("?") in the neighboring charging pads of charging pad 402-A signify this potential ambiguity in identification. For the current example, and without any additional procedure for disambiguation, such a mis-identification may be expected to occur (or at least may be at risk of occurring) with an approximate likelihood of 7%, or approximately 7% of the time. Again, this value and the assumptions that lead to it are presented by way of example. However, the potential mis-identification by a UAV of a designated target charging pad due to limitations on the accuracy of the coarse-navigation mode applies at least conceptually to these and other possible statistical descriptions of navigational accuracy.

In order to aid or achieve disambiguation of identities of charging pads of a charging pad cluster, fiducial markers may be distributed among the charging pads to serve as distinctive visual cues to an imaging system of a UAV. One approach to deploying fiducial markers for this purpose is to provide a set of fiducial markers, each of which is uniquely visually identifiable from among the set, and each of which is placed at a precise (or nearly so) geolocation within a layout of a charging pad cluster. For example, each charging pad may have one or more uniquely identifiable fiducial markers associated with it. The UAV may be provided with information, such as a data table, that lists each charging pad and its associated fiducial markers. The UAV may then be able to cross-check observed fiducial marker identifications and charging pads against the data table in order to resolve mis-identifications of charging pads that may arise due to imprecise navigation, for example. In addition to the use of uniquely identifiable fiducial markers, and precisely (or nearly so) determining each of their geolocations (possibly as well as a specific orientation for each), this approach may also call for relatively regular or routine site maintenance in order to help ensure an accurate and/or up-to-date match between the site deployment and the data table that records it.

Example embodiments herein provide an alternative methodology for using fiducial markers to aid and/or achieve disambiguation of identities of charging pads of a charging pad cluster. Specifically, the alternative methodology involves using patterns or constellations of fiducial markers formed by their relative positions and orientations with respect to charging pads of a cluster to distinguish between the charging pads. In accordance with example embodiments, a respective sub-plurality of fiducial markers in the vicinity of each respective charging pad may form a different apparent constellation in relation to the respective charging pad. A reference map of the cluster that captures an aggregate of the respective constellations may be generated and provided to a UAV, and may then be used by the UAV for comparing constellations observed with its imaging system with "reference constellations" in the reference map. The UAV may thus use the comparisons to disambiguate between observed charging pads, and thereby correctly identify a designated target charging pad.

Figure 4C:
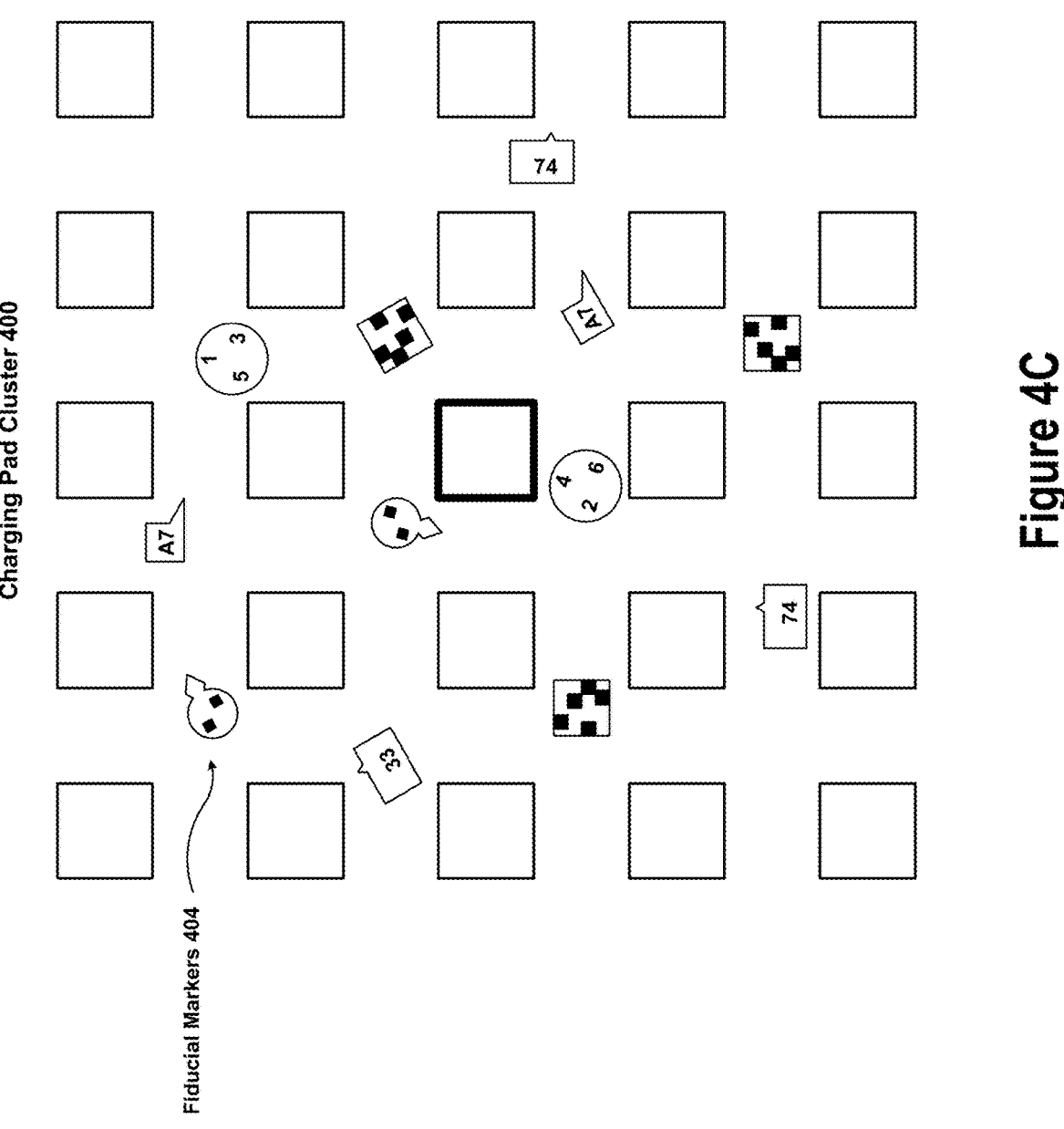
FIG. 4C illustrates an example charging pad cluster with example fiducial markers, in accordance with example embodiments.

FIG. 4C illustrates an example charging pad cluster 400 with example fiducial markers 404, in accordance with example embodiments. For purposes of discussion, the fiducial markers 404 are represented somewhat cartoonishly as arbitrary shapes and with graphic patterns that serve as identifiable features. Thus, as shown the orientation of a fiducial may be distinguishable by its shape (e.g., having an asymmetry and/or a graphic pattern, such as graphic markers or numbers). The positions of the fiducial markers 404 across a layout of charging pads of a cluster may be configured according to a specific pattern, randomly assigned, or some blend of both, for example. Any arrangement should yield distinguishable constellations among the charging pads.

As shown in FIG. 4C, there is some repetition among the fiducial markers 404. In the example illustrated, instances of identical fiducial markers appear in different orientations, but this need not be a requirement, so long as distinguishable constellations can emerge from the distribution of fiducial markers. However, using different orientations among identical fiducial markers may enhance the recognizability of constellations. In any case, the ability to distinguish different constellations even with the inclusion of at least some identical fiducial markers may make it possible to use at least some non-uniquely identifiable fiducial markers among a plurality of fiducial markers deployed across a charging pad cluster.

In some embodiments, the fiducial markers may be "April tags." As is known, April tags comprise graphical patterns of "low resolution" QR-like codes. Three square fiducial markers in FIG. 4C represent an example of the same April tag in three different orientations, distinguishable by the orientation of the graphic pattern and/or of the square shape. For at least the purpose of this discussion, and possibly in at least one or more actual deployments, however, fiducial markers in addition to, or other than, April tags may be used.

The illustrative depiction of charging pad cluster 400, including the fiducial markers, in FIG. 4C may be considered as representing a specified layout of charging pads 402 and fiducial markers 404, or as representing a view or image taken from above of an actual deployment. In the latter case, an aerial image of charging pad cluster 400 may be captured by the imaging system of a UAV that is hovering directly over charging pad 402-A at the center of the grid, for example. Such an image may be used to generate a graphical reference map of the charging pad cluster 400, which may then be provided to UAVs having missions that include flying to and landing on a designated target charging pad of the cluster.

In accordance with example embodiments, and as described in more detail below, a server in an infrastructure support network for UAVs may receive aerial observation data of charging pad cluster 400 from one or more UAVs, and may process the aerial observation data to generate a graphical reference map of the charging pad cluster 400. The reference map may represent an optimization of aerial observation data in a form that may correct or compensate for possibly multiple perspectives and positions with respect to the charging pad cluster 400 from which the aerial observation data may have been captured. One or more UAVs may have captured and processed one or more images to produce respective aerial observation data, and then transmitted (or otherwise provided) the aerial observation data to the server. The one or more UAVs may have captured the one or more images as part of specific missions to survey the charging pad cluster for the purpose of obtaining the images for generating the reference map. Additionally or alternatively, the one or more UAVs may have flown to the charging pad cluster 400 and captured the images as part of operations to disambiguate charging pads in order to identify a designated target charging pad. Aerial observation data from such images may be used by the server to update, revise, and/or further optimize an existing reference map, as described below.

In some example operations, a UAV may start a mission from a particular "launching" charging pad. In an initial operational state prior to flight, the UAV may not have awareness of the charging pad identity, and may first ascend vertically to obtain an aerial image of the charging pad cluster in order to apply context-based navigation to determine its launching charging pad. The aerial image so obtained and/or processed information therefrom may be sent from the UAV to the server to provide a further image for updating and/or optimizing an existing reference map. In some operational scenarios, the server may use information in (or processed from) the aerial image obtained from the UAV's initial ascent to determine an identification of the UAV's launching pad, as well as the UAV's geolocation and orientation. The server may then provide the determined geolocation and orientation to the UAV in order to help initialize the UAV's operational state. This procedure is described in more detail below.

FIG. 4D illustrates an example charging pad cluster with example fiducial markers as viewed from two different hypothetical perspectives, in accordance with example embodiments. Two panels are shown, panel (a) above and panel (b) below, each conceptually representing an aerial image of charging pad cluster 400 as captured from a position above a different charging pad. In each panel, an "X" marks the charging pad above which the image was (hypothetically) obtained from. The perspectives as illustrated are somewhat exaggerated, and not necessarily intended to be to scale or otherwise accurate renditions of how the charging pad cluster 400 would actually appear from the positions above the marked charging pads.

In accordance with example embodiments, the server may receive aerial observation data from one or more UAVs. As described below, the aerial observation data may be used by the server to construct a map graph, which may then be optimized to generate a reference map of the cluster. In particular, the reference map may be used as a sort of virtual rendition, as viewed from above, of the constellation of fiducial markers in the vicinity of any given charging pad of the cluster.

Figure 5:
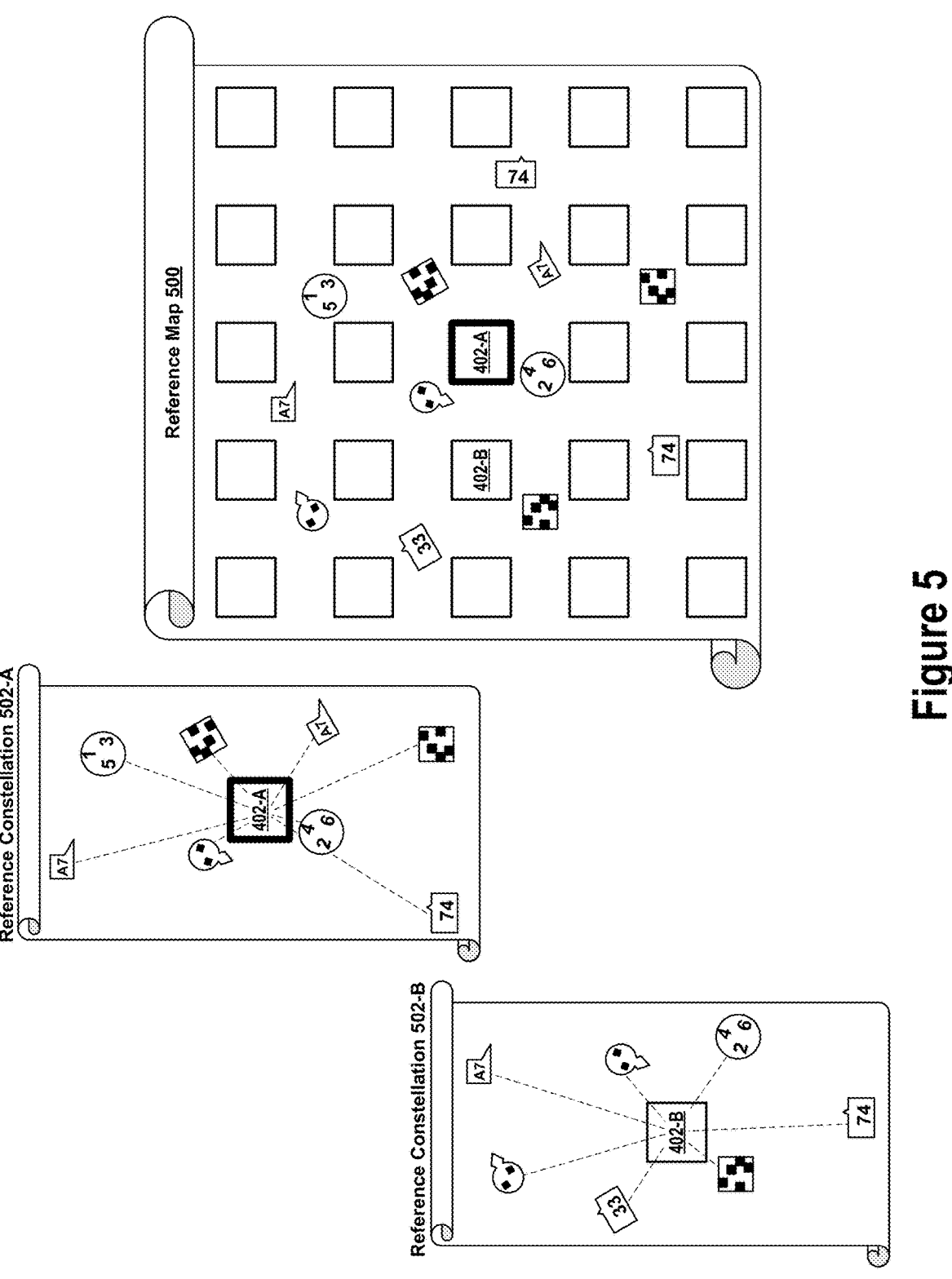
FIG. 5 is representation of an example reference map of an example charging pad cluster and example reference constellations of fiducial markers, in accordance with example embodiments.

FIG. 5 is a representation of a reference map 500 of charging pad cluster 400, also depicting two portions of the map that represent reference constellations 502-A and 502-B of neighboring charging pads 402-A and 402-B, respectively. In accordance with example embodiments, the reference map 500 may take the form of data that may be rendered graphically and/or computationally interpreted in a form equivalent or analogous to a graphical rendering. In FIG. 5, the map 500, shown on the right-hand side, is presented on a scroll-like background as a visual cue for the discussion that the figure illustrates a rendering of data. In some examples, the rendering could take the form of a synthesized image, for example. The reference constellations 502-A and 502-B, shown to the left of the map and similarly presented on scroll-like backgrounds, could be generated distinct subsets of the data of the reference map 500, or identified sub-regions of the reference map but not separately generated. In either case, they serve to illustrate what an idealized view from directly above the respective charging pads 402-A and 402-B may be expected to look like.

More particularly, reference constellation 502-A represents a constellation of fiducial markers at relative positions and orientations with respect to charging pad 402-A as that constellation would be expected to ideally appear from a position above charging pad 402-A. Similarly, reference constellation 502-B represents a constellation of fiducial markers at relative positions and orientations with respect to charging pad 402-B as that constellation would be expected to ideally appear from a position above charging pad 402-B. For the purposes of clarity in the figure, each reference constellation omits the neighboring charging pads. This omission could also be an intentional feature of some example embodiments that generate reference constellations separately from a reference map from which they are derived.

The qualification of a reference view or appearance as "ideal" may be considered a recognition that an actual aerial view or image from a UAV positioned above a charging pad and its associated constellation of nearby fiducial markers may differ to some degree from what appears in the reference map 500 or the reference constellations. Differences between an observed view or image from above an actual charging pad and its appearance in a reference map or reference constellation may be due to various factors. Examples of such factors may include differences in the UAV's orientation and/or altitude with respect to a charging pad cluster compared with an idealized orientation of the reference map; a missing, damaged, or obscured fiducial marker at the charging pad cluster that has not been accounted or corrected for in the reference map, and possible distortions of the idealized view of the reference map due to imperfect optimization of the aerial images used to generate the map. However, in accordance with example embodiments, the spatial distribution of fiducial markers across an arrangement (e.g., grid) of charging pads of a charging pad cluster may be configured such that alignment or matching of an observed constellation to a reference constellation need not necessarily be exact in order to achieve a threshold degree of agreement that may be interpreted as a confirmed match. In this sense, a confirmed match may tolerate some amount of disagreement.

Figure 6:
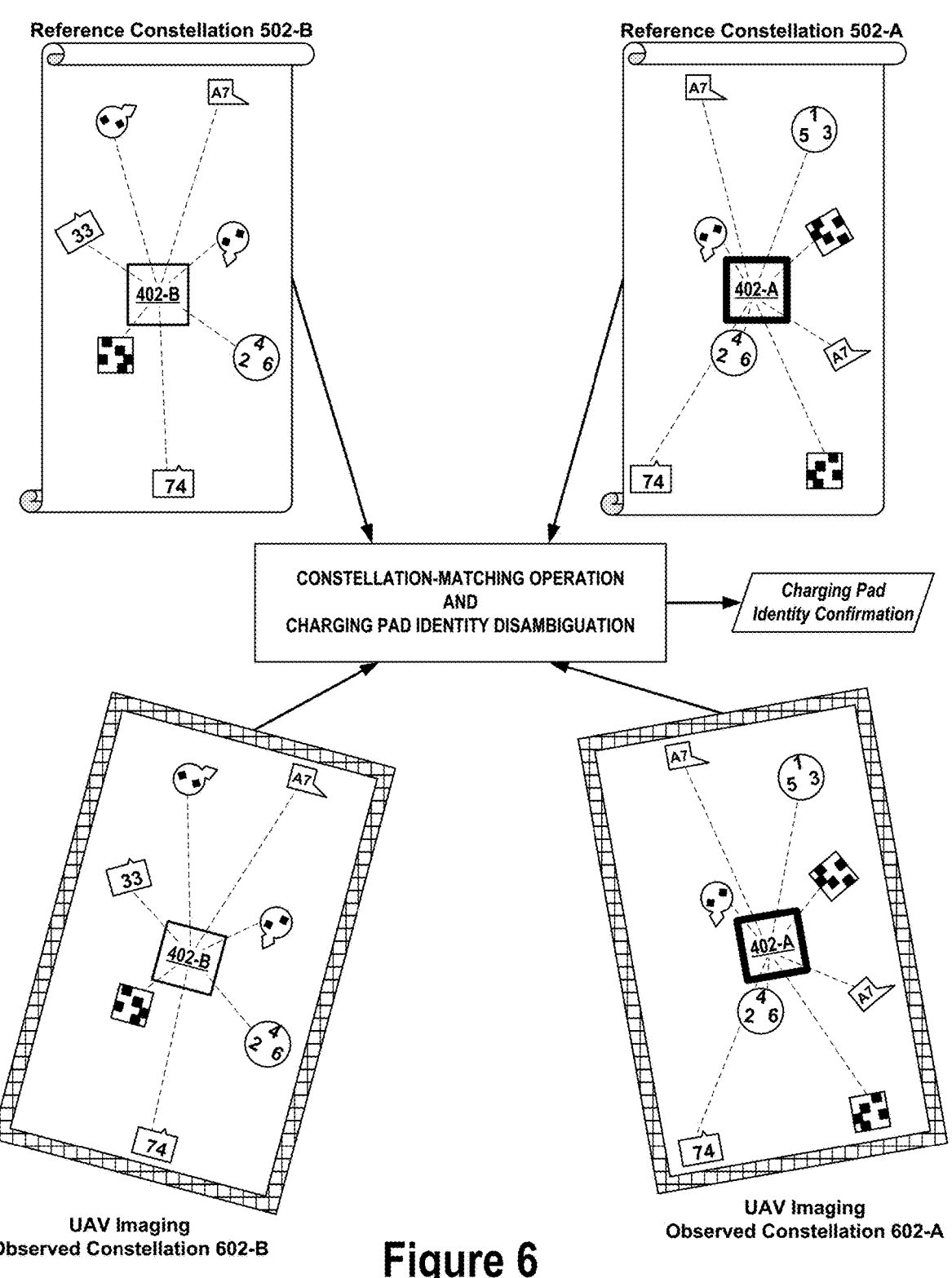
FIG. 6 is a conceptual illustration of an example operation for disambiguating charging pad identities, in accordance with example embodiments.

FIG. 6 is a conceptual illustration of an example operation for disambiguating charging pad identities using context-based navigation, in accordance with example embodiments. Continuing from the discussion above, it may be assumed that charging pad 402-A is a designated target charging pad for a UAV having a mission that includes flying to the charging pad cluster 400, and as described, the UAV may arrive initially at a coarse-navigation location that is above a ground point within approximately 3 meters of the designated target charging pad. For any particular instance, this arrival location could be closer to one of the neighboring charging pads than to charging pad 402-A. FIG. 6 illustrates an example of how the UAV may use the reference constellations 502-A and 502-B to distinguish between charging pad 402-A and 402-B. The need to do so could arise if the UAV's coarse arrival location were above a ground point halfway between the two charging pads, or otherwise insufficiently close to either one to make a confident identification. Additionally or alternatively, UAVs could apply the disambiguation operation routinely, even if their coarse-navigation arrival locations are directly above a charging pad since, as discussed in connection with FIG. 4B, the coarse-navigation location could be above the "wrong" charging pad ~7% of the time (depending on specifics of the coarse-navigation arrival location probability distribution, for example).

In accordance with example embodiments, a UAV may be provided by the server with a reference map 500 prior to arriving at a locale of charging pad cluster 400. For example, the UAV may be provisioned with the reference map 500 as part of preparing the UAV for a mission. In another example, the reference map 500 may be transmitted to the UAV at some point after it begins its flight. If reference constellations of the charging pads are generated separately from the reference map 500 (e.g., as separate data entities, for example), the UAV may also be provided with reference constellations 502-A and 502-B, possibly as well as reference constellations for one or more other charging pads of the cluster. Additionally or alternatively, the UAV may have a computational capability to generate reference constellations 502-A and 502-B (and others) from the reference map 500. Reference constellations 502-A and 502-B shown in FIG. 6 may represent the UAV's copies of these data as obtained or generated by any of the above, or possibly other, means.

Upon arriving at the locale of the charging pad cluster 400, or shortly thereafter, the UAV may acquire one or more aerial images of one or more charging pads nearby a ground point below its coarse-navigation arrival location. The UAV may use its imaging system to obtain one or more images. In one operational example, each image may capture a different one of the charging pads and an observed associated constellation of fiducial markers. Additionally or alternatively, more than one image may be acquired for at least one of the charging pads. As a further or alternative example, the images may correspond to different portions of a continuous video image acquired (or as it is being acquired)

while the UAV hovers in place and/or moves about above the charging pad cluster 400. As still another example, each of one or more images of one or more charging pads may be acquired from respective locations above each of the one or more charging pads. In yet another example, a single image from the UAV's coarse-navigation arrival location may suffice if the UAV's altitude is high enough to render any differences in perspective due to horizontal translations to be negligible in their effect on matching observed constellations to reference constellations.

Which one or more of the above modes of image acquisition is used may depend on operational circumstances, such that a UAV may decide which one best accommodates any particular disambiguation task instance. Additionally or alternatively, a sequence of disambiguation procedures, including what images should be acquired and how, may be more fully specified ahead of time. It should be understood that any of the above or other alternatives may accommodate, or be accommodated by, the principles of context-based navigation as described herein.

For purposes of the present discussion, only reference constellations 502-A and 502-B and aerial images of charging pads 402-A (the designated target charging pad) and 402-B are considered. In practice, the disambiguation operation may need to consider the designated target charging pad and more than one other neighboring or nearby charging pads. As represented in FIG. 6, observed constellations 602-A and 602-B are captured in respective images acquired by the UAV's imaging system. The depictions of the images shown in FIG. 6 may be considered representations of separate image captures in an image plane (e.g., pixel array) of an imaging system, or different regions of a single image capture in the image plane. In some examples, the images may be still images, and in some examples they may represent frames of one or more video images. These examples are not meant to be mutually exclusive, but rather may be different options or modes of operation of the imaging system.

The images may be acquired by any one or more of the example operations described above. Each image depicted is at an angle with respect to the reference constellations 502-A and 502-B to signify a possible orientation of the UAV and/or the camera component of its imaging system with respect to a reference direction of the charging pad cluster 400 (e.g., as define by the X and Y axes of FIG. 4A). For purposes of clarity in the figure, neighboring and/or nearby charging clusters are omitted from the images. In actual operation these charging pads may be visible in one or more of the images. However, their presence in an image would not be expected to change the appearance of the observed constellations.

In accordance with example embodiments, the UAV (or a controller or other processing entity thereof) may compare the observed constellations 602-A and 602-B of the acquired images with the reference constellations 502-A and 502-B in an attempt to positively identify the observed charging pad in each image. In this way, the UAV may be able to positively identify charging pad 402-A as its designated target charging pad, and then proceed to land on it (e.g., assuming landing on the charging pad is specified in its mission). Confirmation of the identity of an observed charging pad may be carried out by a constellation-matching operation and charging pad identity disambiguation, indicated by the so-labeled block at the center of FIG. 6. As shown by way of example, inputs to this block may be the reference constellations 502-A and 502-B and the UAV images of the observed constellations 602-A and 602-B. The output of the operation is the charging pad identity confirmation, as indicated by the so-labeled data item icon.

In making a match, the matching operation carried out by the UAV (or its controller, for example) may compensate for differences in the orientations of the acquired images and the reference constellations. In accordance with example embodiments, the matching operation may utilize, or be implemented as, a computational pattern-matching algorithm. For example, pattern matching may function by treating a charging pad and the fiducial markers of an associated constellation as vertices of a graph, and thereby seek to align vertices in an observed constellation with vertices in a reference constellation. For each attempted match, a goodness-of-fit statistic may be computed and compared with a threshold. A fit that exceeds the threshold may be considered a match. If there is more than one potential match, then one that maximally exceeds the threshold may be deemed the positive match.

In another example, the matching operation may utilize, or be implemented as, a machine-learning model or program. For example, an artificial neural network (or similar machine-learning model) may be trained to recognize matches among two or more input graphical patterns. Such a model may then be used to predict a confidence metric for a match between a given reference constellation and one or more observed constellations. The confidence metric may then be used in a similar manner to a goodness-of-fit statistic described above.

It will be appreciated that there may be other programs, algorithms, and/or procedures for determining a match between a given reference constellation and one or more observed constellations. In accordance with example embodiments, matching for disambiguation of charging pad identities and/or identity confirmation may be equivalently or analogously achieved by determining a match between a given observed constellation and one or more reference constellations. A positive identification of a charging pad may be derived from either "direction" of matching.

As with the various modes of image acquisition, there can be various sequences of operations for determining a match between reference constellation 502-A of charging pad 402-A as it appears in the reference map 500 and one of the observed constellations in order to confirm a positive identification of the UAV's designated target charging pad. The direction of matching—i.e., matching a reference constellation to one or more observed constellations, or matching an observed constellation to one or more reference constellations—is one example of variation. Other, non-limiting examples are described in the following.

In one example, a charging pad closest to a ground point below a UAV's coarse-navigation arrival location may be selected as an initial guess for the UAV's designated target charging pad. This may be based on a known probability distribution for coarse-navigation arrival positions that peaks at a designated navigational target, as illustrated in FIG. 4B, for example. Initially, the UAV may acquire one or more images of just the selected charging pad, and may then check if an observed constellation in the one or more images matches a reference constellation of the designated target charging pad (e.g., charging pad 402-A in the above example). If a match is found, a confirmation may be made effectively on the first try. If a match is not found, the UAV could acquire one or more images of a next-nearest charging pad, and again check if the constellation of the image(s) matches the reference constellation. If not, the process could repeat for as many observed charging pads as necessary until a match is found.

In an alternative to the above example, if the observed constellation of initial selected charging pad does not match the reference constellation of the designated target charging pad, further matching attempts against other reference constellations may be made until a match is found. This match would not identify the designated target charging pad, but would confirm an identity of the charging pad closest to the ground point above the UAV's arrival location. This information could then be used to inform or optimize a search strategy for selecting a next guess of observed charging pad to image and check for a match. Again, this process could repeat until a positive match of the UAV's designated target charging pad is determined.

In still another example, the UAV may acquire one or more images of several—e.g., four or five-charging pads nearby, and including, an initial best guess (e.g., one closest to a ground point below the UAV's arrival location). These could be obtained by the UAV moving about horizontally to locations above each of the charging pads to be imaged. Alternatively, as described above, if the altitude of the UAV's coarse-navigation arrival location is high enough, a single one (or a few) images from the arrival location may capture all of the nearby charging pads in the image field of view (FOV) with negligible perspective distortion across the image. For either image acquisition procedure, a reference constellation of the designated target charging pad could be compared against respective constellations associated with each of the charging pads in the one or more images to find out which one produces a match. The best match could then be used as a confirmation of identity of the designated target charging pad.

As still a further example, images of multiple observed constellations and multiple reference constellations may be input to the matching operation, such as a pattern matching algorithm and/or machine-learning model (e.g., trained to recognize matching patterns and output statistical confidences of detected matches). The output of the matching operation could confirm identities of one or more charging pads associated with the observed constellations. The UAV could then determine which of the confirmed identities corresponds to its designated target charging pad.

As noted, the above techniques and procedures for determining matches between observed constellations and reference constellations in order to disambiguate among multiple observed charging pads are not intended to be limiting. Rather, all of these and others illustrate that there may be numerous ways to implement the principle of context-based navigation, and demonstrate the flexibility and versatility of using distinguishable constellations of fiducial markers in the vicinities of observed charging pads to confirm identities of the observed charging pads. Applied by (or for) UAVs that may otherwise have only a coarse-navigation mode that provides insufficient accuracy for the UAVs to make confident identifications based on coarse-navigation arrival positions, context-based navigation thereby enables UAVs to fine tune their navigation capabilities. As also noted, a general degree of tolerance of context-based navigation to imperfect matches of observed and reference constellations may reduce and/or relax possibly stringent requirements on charging pad cluster site maintenance as it applies to upkeep of fiducial markers.

In further accordance with example embodiments, a UAV at a coarse-navigation arrival location may have a real-time communicative connection with a mission operations server in the infrastructure support network, such that some or all of the matching operations described above may be carried out by the mission operations server (or other support system of the network). As an example, the charging pad cluster at the locale of the UAV's coarse arrival location may deploy a WiFi network to which the UAV may connect, as described above, for example. The WiFi network may have a broadband interface (e.g., via a gateway router, for example) providing a link to the mission operations server. Additionally or alternatively, the UAV may have its own broadband interface (e.g., SIM card) that provides a communicative link to the mission operations server. For either of these (or other) communication scenarios, the UAV may transmit in real-time (or near real-time) some or all of its observed images to the mission operations server. The mission operations server may then carry out the analysis described above to determine a confirmed identity of the UAV's designated target charging pad, and then transmit the confirmation information back to the UAV. The UAV may then proceed based on the confirmed identity.

In some server-based implementations, the mission operations server may maintain the requisite reference maps and reference constellations, such that UAVs might not necessarily be required to carry (or be provisioned with) their own copies. The UAVs may then only need to transmit in real-time (or near real-time) their images of observed charging pads. In other implementations, UAVs may carry (or be provided with) reference maps and reference constellations, and may thus transmit in real-time (or near real-time) their images of observed charging pads, as well as any reference constellations needed for matching (e.g., according to one or more of the above techniques). These are just examples of context-based navigation in which a mission operations server may carry out various aspects of matching and disambiguation.

While example embodiments of context-based navigation have been described above in terms of charging pads and charging pad clusters, the principles may be applied, adapted, and/or extended to other types of navigation targets and configurations thereof. An example of a different usage scenario of context-based navigation using fiducial markers in a manner substantially similar to that described above involves automatic loading facilities used in UAV delivery operations. In an example deployment, delivery UAVs may pick up or retrieve payloads or packages from automated payload dispensers or loaders that are distinct from charging pads, and possibly configured at facilities separate from charging pad clusters. Such an operational scenario for payload pick-up may be used as an alternative to payload pick-up at charging pads, or as an additional mode that augments charging-pad pick-ups.

In accordance with example embodiments, multiple automated payload loaders, sometimes referred to as "autoloaders," may be deployed in arrangements similar to charging pads at a cluster. For example, a cluster of autoloaders may be configured in a layout at a warehouse or other storage facility. Some or all of the autoloaders may be, or appear to be, sufficiently alike as to make them potentially indistinguishable (or nearly so) to an imaging system of a UAV. A UAV with a mission plan that includes flying to a designated target autoloader at such a facility may face the same or similar navigational challenges as those described above in connection with charging pads and charging pad clusters. A plurality of fiducial markers may thus be distributed across a layout of autoloaders in the same or similar manner as that described for charging pad clusters. With such an arrangement, the principles of context-based navigating using observed and reference constellations of fiducial markers may be straightforwardly applied to clusters of autoloaders. A UAV may thus be able to distinguish between and/or disambiguate autoloaders, and thereby confirm an identification of a designated target autoloader.

It should be understood that confirmation of the identification of a designated target autoloader by a UAV need not necessarily be followed by the UAV landing on the target autoloader (or charging pad, for that matter). For example, in some UAV delivery scenarios, a UAV may hover above an autoloader and lower a tether to retrieve a payload or package, then reel the tether back in to secure the payload to the UAV (the same operation could apply for a payload or package retrieved from a charging pad). Other remote retrieval techniques that do not necessarily require a UAV to land may be used as well.

As another example of a different usage scenario of context-based navigation, charging pads and/or autoloaders may be equipped or configured with unique identifiers, such as unique April tags or other forms of fiducial markers, such that under expected operational conditions the charging pads and/or autoloader are visually distinguishable from one another by an imaging system of a UAV. In this arrangement, UAVs may be able to distinguish between, or disambiguate, charging pads and/or autoloaders much or most of the time—e.g., 80-90% of the time possibly on the basis of the unique markers of the charging pads alone. But the arrangement of uniquely identifiable charging pads may also serve as its own form of constellations, even without necessarily including separate fiducial markers in the manner described above. Thus, in accordance with example embodiments, context-based navigation may also be achieved as described above by using observed and reference constellations of uniquely identifiable charging pads (and/or autoloaders). As with the approach using separate fiducial markers, uniquely identifiable charging pads (and/or autoloaders) as constellations may provide the same or similar tolerance or resilience to the ability of UAVs to make positive identifications when faced with markers that become damaged, degraded, and/or obscured by detritus, for example.

These are just two examples of additional or alternative applications of context-based navigation using observed and reference constellations of fiducial markers. It should be understood that the principles may be adapted, extended, and/or applied to other usage scenarios as well.

VI. Example Automated Discovery, Monitoring, and Mapping of Clusters and Cluster Assets As described briefly above, reference maps of charging pad clusters, such as reference map 500, may be generated by a server in a UAV infrastructure support network, using aerial observation data collected by one or more UAVs in the course of routine flights to clusters and/or designated survey flights to clusters. In accordance with example embodiments, reference maps may be generated and maintained as part of an asset management system that may also perform tracking (e.g., establishing and maintaining status records, etc.) of ground-based assets of charging pad clusters—e.g., charging pads, fiducial markers, and/or autoloaders—and/or other UAV ground-support facilities. In addition to one or more servers, an asset management system may include an asset database for storing both reference maps and asset records. By way of example, and referring again to the UAV system 300 of FIG. 3, an asset management system may be implemented in, or be part of, a central dispatch system 310 or other facility of a UAV system. An example of such an arrangement is illustrated in FIG. 7A, which depicts an asset manager 700 and an associated asset database 712 as part of the central dispatch manager 310.

In the example of FIG. 7A, asset manager 700 may include one or more servers or other computing systems configured for carrying out tracking of ground-based assets and generation and maintenance of reference maps. As noted, the associated asset database may be configured for storing and maintaining ground-based assets and reference maps generated by the asset manager 700. The asset manager 700 may also include, or be communicatively connected with, a communications interface for communications with UAVs. For example, asset manager 700 may be communicatively connected with a cellular wireless interface to a cellular network that operates according to 3G, LTE, 4G, or 5G, among other possible protocols.

Asset management as carried out by an asset management system of a UAV system, including reference map generation and asset tracking, may be understood in terms of example operation involving just a single representative, example UAV 100 (from FIG. 1A) in FIG. 7A. By way of example, UAV 100 is depicted as stationed (e.g., hovering) above the charging pad marked with an "X" in charging pad cluster 400 of FIG. 4D, panel (a). For the sake of brevity in FIG. 7A, only four charging pads and two fiducial markers of cluster 400 and show (ellipses indicate the further expanse of cluster 400). The aerial geolocation and orientation of UAV 100 are designated as its pose 701. As used herein, the term pose may specify the location and position of a UAV, including its geographic coordinates, altitude above ground level (sometimes referred to as "AGL"), and angular orientation (e.g., pitch, roll, and yaw).

In accordance with example embodiments, geolocation may be determined from GPS coordinates, as indicated in a communication link (lightning bolt) between UAV 100 and a GPS satellite 702, although other geolocation techniques may also be used. Altitude may be determined in one or more of a variety of ways. For example, it could be directly measured if the UAV 100 is equipped with a measuring device such as an altimeter, or RADAR or LIDAR for measuring line-of-sight distances. As another example, the UAV 100 could triangulate distance by shifting its position horizontally by a specified distance (while maintaining altitude) and measuring a resulting parallax (angular) shift of an object on the ground. As still another example, the UAV could compare a known actual linear size of asset on the ground with its apparent (observed) size (e.g., in a real-time image). Other techniques may be possible as well. UAV 100 may determine its angular orientation from an inertial measurement unit, such as IMU 202 shown in FIG. 2, for example.

The components of pose 701 may be specified to locate the origin and angular orientation of a UAV coordinate system (tied to UAV 100) within a pose coordinate system (e.g., geographic latitude and longitude, altitude, and geographic or magnetic North). As such, a known position and orientation of an imaging system of UAV 100, specified with respect to the UAV coordinate system, may be used to transform any image captured in an imaging plane of the imaging system to the pose coordinate system, or to any desired orientation therein.

In accordance with example embodiments, UAV 100 may use one or more images of all or a portion of cluster 400 acquired from one or more pose positions above the cluster 400 to determine vector positions to one or more assets of the cluster 400. The example illustration of FIG. 7A depicts six representative vectors 703 to four charging pads and two fiducial markers of cluster 400 that UAV 100 has determined from its pose position 701; there could be additional determined vectors as well to other ground-based assets of cluster

400. Each vector may specify a location or positon of a respective ground-based asset reckoned with respect to the UAV coordinate system (e.g., as x, y, and z vector components), which is positioned according to the pose position 701.

Vector components of any given ground-based asset may be determined from an image or snapshot of the cluster 400 in one or more of a variety of ways. For purposes of illustrating just one example, it may be assumed that the image plane of an imaging device of the UAV is parallel to the x-y plane of the UAV coordinate system, which may in turn be assumed to be normal to yaw-axis of UAV 100. It may be further assumed that the z-axis of the UAV coordinate system is parallel to the yaw-axis. Further assuming that cluster 400 is configured on a level (horizontal) plane, the altitude of the UAV 100 may be taken as the z-component of a position vector of the given asset. The x-y position of the given asset in the image plane may then be converted by straightforward geometry to x and y vector positions in the UAV coordinate system. If the image plane is not parallel to the x-y plane, and/or if UAV 100 is not stationed horizontally when the image is captured, then one or more additional rotational translations may be necessary to determine the vector components from the image data and pose position. However, all such transformations may be achieved with routine geometric operations.

In accordance with example embodiments, UAV 100 may capture multiple images from different pose positions, and determine more than one vector position for any one or more assets of the cluster 400. For example, UAV 100 may obtain images from multiple pose positions if it is carrying out a designated survey mission. As another example, images from more than one pose position might be necessary if UAV 100 uses parallax to determine altitude. As noted, another technique for determining altitude is to compare an apparent size of an asset in the image plane with a known size of the asset. For example, charging pads may typically have known linear dimensions. Thus, comparison of the observed size in an image with the known size may yield a line-of-sight distance, which could correspond to a z-component if UAV 100 is hovering directly over the charging pad, or converted to a z-component via additional geometric operations otherwise.

Also in accordance with example embodiments, the imaging device of UAV 100 may be a video camera or device that produces video frames of cluster 400 (or of any other field of view of the video device). In this arrangement, video frames may be processed by the video device and/or by a processing operation of UAV 100 to effectively generate still-image snapshots of cluster 400 from sequences of frames captured from the same (or nearly the same) pose positions. For example, assuming the video device produces 24 frames per second, a snapshot might be generated every 10 seconds of constant (or nearly constant) pose position by processing—e.g., averaging-successive sequences of 240 frames. UAV 100 may also record the pose and time of each snapshot.

In further accordance with embodiments, UAV 100 may identify some or all assets in each snapshot image, and determine vector positions to some or all of the identified assets. To the extent that the same asset is identified in multiple snapshot images, UAV 100 may thus determine more than one vector to that asset. If at least some of the multiple snapshots correspond to different pose positions, then at least some of the vectors of the asset may represent a view of the asset from different perspectives of the imaging system of UAV 100. This arrangement of multiple vectors for the same asset may apply to more than one asset of cluster 400.

In practice, techniques used by UAV 100 to identify charging pads in a cluster may differ from those used to identify fiducial markers (or possibly other forms of ground-based assets). For example, identification of charging pads in multi-frame snap shots may use a different number of frames per sequence than identification of fiducial markers. There may also be differences between algorithms used to identify charging pads and those used to identify fiducial markers. As such, in some examples, identification of assets, and determinations of vectors to them, may be carried out separately for charging pads and fiducial markers.

In some examples, identifications of assets assigned by UAV 100 may only identify a type of asset—e.g., a charging or a fiducial marker—but might not include unique (or presumed unique) identifications. For example, charging pads might not have any distinguishing identifiers, but rather may appear identical to one another. And as described above, the use of constellations of fiducial markers for fine-mode navigation may relax any requirement that all fiducial markers of a cluster carry unique identifications, so long as no two or more identically-identified fiducial markers are situated closer than some distance and/or relative position threshold of each other. As described below, the asset manager, using aerial observation data transmitted from UAVs, may generate reference maps without necessarily requiring exact knowledge of asset identifications.

In accordance with example embodiments, UAV 100 may send its above-described observations, measurements, and determinations to the asset manager 700 in the form of aerial observation data 705, as indicated in FIG. 7A. The aerial observation data 705 may include one or more determined vector positions to each of one or more ground-based assets of cluster 400, a pose position from which, and time at which, each vector position was determined, and an asset identification associated with each of the one or more determined vector positions. In further accordance with example embodiments, UAV 100 may generate aerial observation data 705 on a continuous basis, periodically, and/or episodically while carrying out aerial operations above cluster 400 or the locale of cluster 400. For example, UAV 100 may generate aerial observation data 705 in a sequence of subsets every 10 seconds, corresponding to 10-second snapshots, as described above. It should be understood that subsets could correspond to different intervals, as well, and subset intervals need not necessarily be the same length.

UAV 100 may use a wireless network connection with the asset manager 700 to transmit the aerial observation data 705. As described above, such a wireless network connection (depicted as a lightning bolt between UAV 100 and the asset manager 700) could be provided by a cellular wireless network operating according to one or more known protocols. In some examples, UAV 100 may transmit aerial observation data subsets to the asset manager 700 continuously, as the subsets are generated. Additionally or alternatively, UAV 100 may transmit aggregations of subsets periodically or episodically. As still another example, UAV 100 may choose from among multiple, different transmission modes according to operating conditions or scenarios.

Advantageously, data components of aerial observation data 705 may be constructed and/or formatted relatively small in terms of required transmission size, particularly compared with typical data sizes and volumes of still and/or video images (and numbers of video frames). As such, cellular wireless transmissions of aerial observation data 705 may incur relatively low cost in terms of bandwidth and/or monetary charges. This may, in turn, help keep operational costs of asset management relatively low.

In accordance with example embodiments, the asset manager 700 may use aerial observation data 705 received from UAV 100 to create a new reference map, or update an existing reference map, of cluster 400. The asset manager 700 will use received aerial observation data 705 to create a new asset record, or update an existing asset record, for each distinct asset represented in the aerial observation data. Reference map for known clusters of a UAV system, as well as asset records for known ground-based assets (charging pads and fiducial markers), may be stored as asset tracking data 707 in the asset database 712, as indicated in FIG. 7A. Example techniques for generation of reference maps are described below.

FIG. 7B illustrate example formats of aerial observation data 705 and asset tracking data 707, in accordance with example embodiments. As shown, aerial observation data 705 may include an UAV ID of the UAV that generated the data, and a Cluster ID of the charging cluster to which the data refer. The UAV ID "7E1" and Cluster ID "5094" in FIG. 7B are arbitrary examples for purposes of illustration. Aerial observation data 705 may be constructed by grouping determined position vector positions and their associated asset IDs according to a UAV pose from which, and time at which, the observations used in the vector determinations were obtained.

By way of example in FIG. 7B, three UAV poses, Pose1, Pose2, and Pose3, at times T1, T2, and T2, are shown. Each pose and time could correspond to an average snapshot from a sequence of video frames, or a single still image at the associated time. At Pose1, assets identified as ID1, ID2, and ID3, were observed, with determined vectors $(x11,y11,z11)$, $(x12,y12,z12)$, $(x13,y13,z13)$, where the first index of the vector components refers to the pose ID, and the second index refers to the asset ID. Similarly labeled groups of asset IDs and vectors are shown for Pose2 and Pose3. Vertical ellipses indicate possible additional poses and associated data. As an illustration of how a given asset may be observed from different poses, assets ID1 and ID2 are shown to have been observed from poses 1, 2, and 3. Similarly, asset ID2 is shown to have been observed from poses 1and 2. Asset ID4 is shown to have been observed from pose 3.

The example asset tracking data 707 is shown in FIG. 7B as including asset records 709 and reference maps 711. By way of example, each asset record 709 is shown as including an asset ID of the tracked asset, a cluster ID of the charging cluster to which the asset belongs, and map coordinates of the asset in a reference map of the asset's cluster. For each asset, the asset record 709 also includes historical data, recording historical values of vector positions of the asset as determined from a recorded pose position at an associated recorded time. In this example, the cluster ID of an asset record 709 may be used as a pointer to a current reference map of the cluster, and the map coordinates of an asset may refer to coordinates of the asset in the current reference map. As described below, the historical data of a given asset, and of any other assets in the given asset's cluster, may be applied with any newly-received aerial observation data for assets in the cluster to update the current reference map.

In FIG. 7B, assets with asset ID 1, 2, . . . , 9, . . . are shown as illustrative examples. The cluster IDs 5094 and 6215 are also just illustrative examples. In some examples, the asset IDs in the asset records may not necessarily correspond exactly to the asset IDs used in the aerial observation data 705. This may be the case, for example, if the asset IDs in the aerial observation data 705 are used only to tag assets as distinct input entities of map graph optimization, while the asset IDs in the asset records 709 are applied as unique identifiers in a reference map determined from map graph optimization. The indices of the map coordinates (e.g., xml, ym1) in the asset records 709 correspond to the asset IDs, and the indices of the historical data (e.g., time91) correspond to the asset ID and history sequence index, respectively. Other indexing schemes could be used as well.

In accordance with example embodiments, reference maps 711 may include a map record for each current reference map. Each map record may include a cluster ID of the cluster to which the reference map applies, a timestamp indicating when the reference map was created or updated, and a pointer to a file or other data structure where a graphical representation of the map may be stored. The stored graphical representation of a reference map may be retrieved and provided to a UAV for navigation to the cluster associated with the map, as described above, for example. The reference map may also be retrieved as part of an updating procedure, as described below.

In accordance with example embodiments, a reference map of a cluster may be generated by using vector positions and poses of assets from aerial observation data of the cluster to construct a connected graph, referred to herein as a map graph, and then to optimize the map graph to determine positions of the assets rendered in the form of a map. In the map graph, the assets-charging pads and fiducial markers—and one or more poses from which vectors were determined may define nodes, where the positions of the nodes correspond to apparent positions of assets in a common reference plane. The apparent positions may be determined by straightforward geometric transformations of vector positions with respect to the associated pose (or poses) to the common reference plane. Apparent distances between the nodes may define connecting edges of the map graph. The edges may further be conceptualized as elastic connections, such as springs, with spring constants having strengths inversely related to measurement uncertainties of the apparent distances. Thus, the smaller the uncertainty, the stronger the spring constant, and vice versa.

Optimization of the map graph adjusts the relative distances between nodes, thereby adjusting the apparent positions of the nodes toward the actual positions of the associated assets. The spring constants act to enforce greater resistance to changing relative positions between pairs of nodes connected by edges with low measurement uncertainties (i.e., strong spring constant), and to offer less resistance to changing relative positions between pairs of nodes connected by edges with higher measurement uncertainties (i.e., weaker spring constant). In practice, measurement uncertainties may be due to a number of factors. Non-limiting examples may include GPS measurement accuracy (itself affected by signal strength and/or interference, for example), positional stability of UAVs during acquisition of observational data, weather conditions, poses of UAVs, and ground conditions that may impact visibility to, or distinguishability of, assets.

A reference map may be generated in this manner from the optimization of a map graph constructed using only UAV observations and the associated poses from which the observations were made. The technique may be thought of as a sort of bootstrapping using relative positions between the UAV or UAVs and the assets. A class of analytical algorithms of this form is sometimes referred to as simultaneous localization and mapping, or "SLAM." In some implementations of SLAM or SLAM-like techniques, edges may be configured only between node pairs consisting of one "pose node" and one "asset node" and between pairs of pose nodes. However, other map graph configurations may be used.

In principle, a map graph can be constructed, and a resulting reference map generated, from observations of just a single UAV at one pose position above a cluster. That is, the analytical expression of the graph optimization may be formulated from just one set of vectors determined from a single observation point. In practice, however, multiple sets of vector determinations from multiple poses may yield superior accuracy of results. Including observations from multiple UAVs obtained at different times may improve accuracy even more. However, for purposes of illustrating SLAM or similar techniques, only a single, more limited set of observations may be considered.

Figure 8:
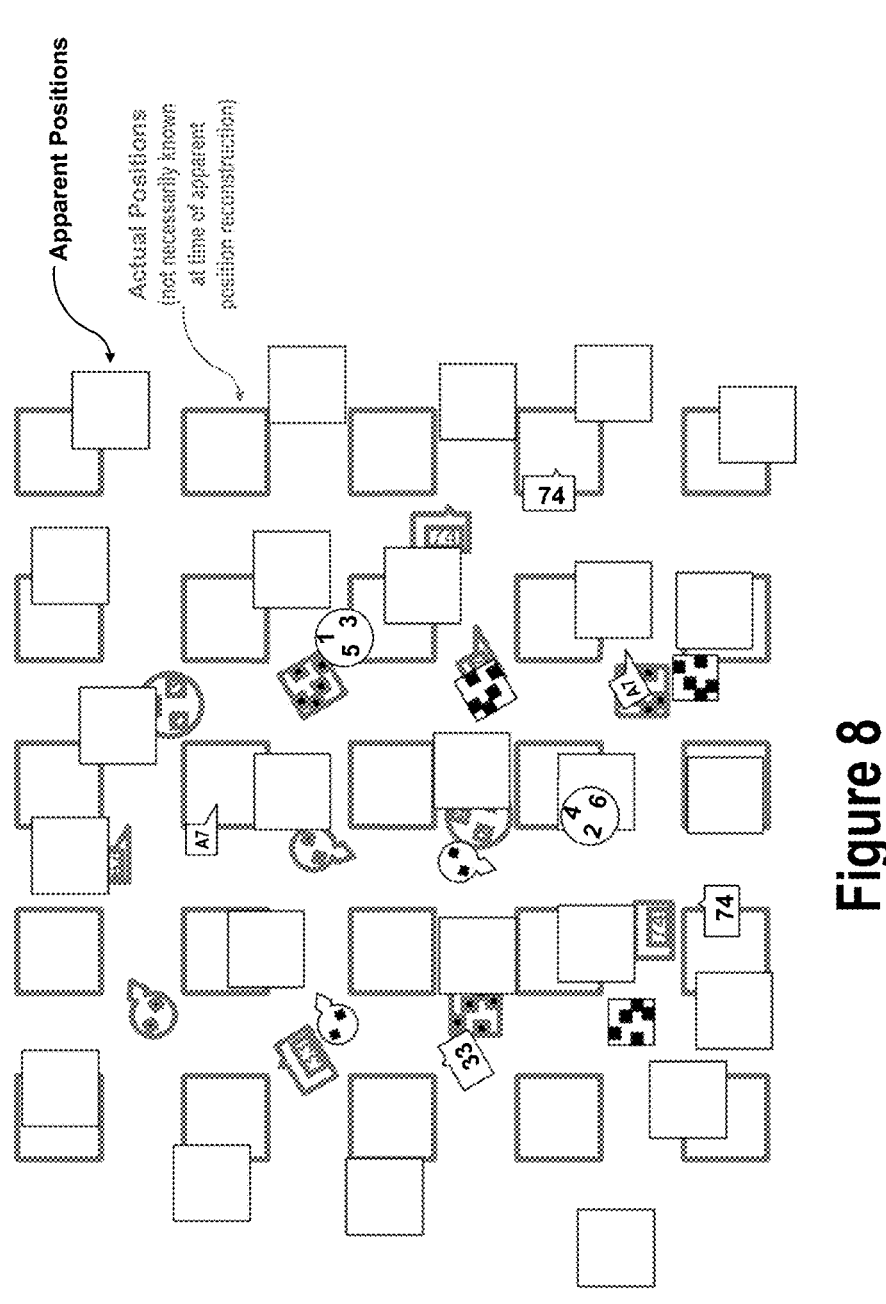
FIG. 8 is a conceptual illustration of apparent positions of ground-based assets as viewed by a UAV, in accordance with example embodiments.

FIG. 8 is a conceptual illustration of apparent positions of ground-based assets as viewed by a UAV, in accordance with example embodiments. In this illustration, actual positions of charging pads and fiducial markers of charging cluster 400 are shown in gray, while the apparent positions determined from observations are shown in black, as indicated. By way of example in this illustration, the apparent positions are assumed to have been observed from just one UAV pose, such as pose 701 shown in FIG. 7A. As noted, aerial observations may be obtained from multiple poses and multiple UAVs. For any particular observation or set of observations by a UAV, the actual positions may not necessarily be known to the UAV when the observations are made. For example, if the UAV is carrying out a first-time survey of a new charging pad cluster, it may not have a reference map. In FIG. 8, the actual positions serve as reference positions to illustrate how apparent positions may differ therefrom. The apparent positions of the assets in FIG. 8 represent reconstructed positions determined by the asset manager 700 using aerial observation data to transform the vector determinations of the UAV to apparent ground positions, as described above. The evident misalignment of actual and reconstructed apparent positions depicted in FIG. 8 may include possible exaggerations and arbitrary directional shifts that serve to illustrate the concept.

Figure 9:
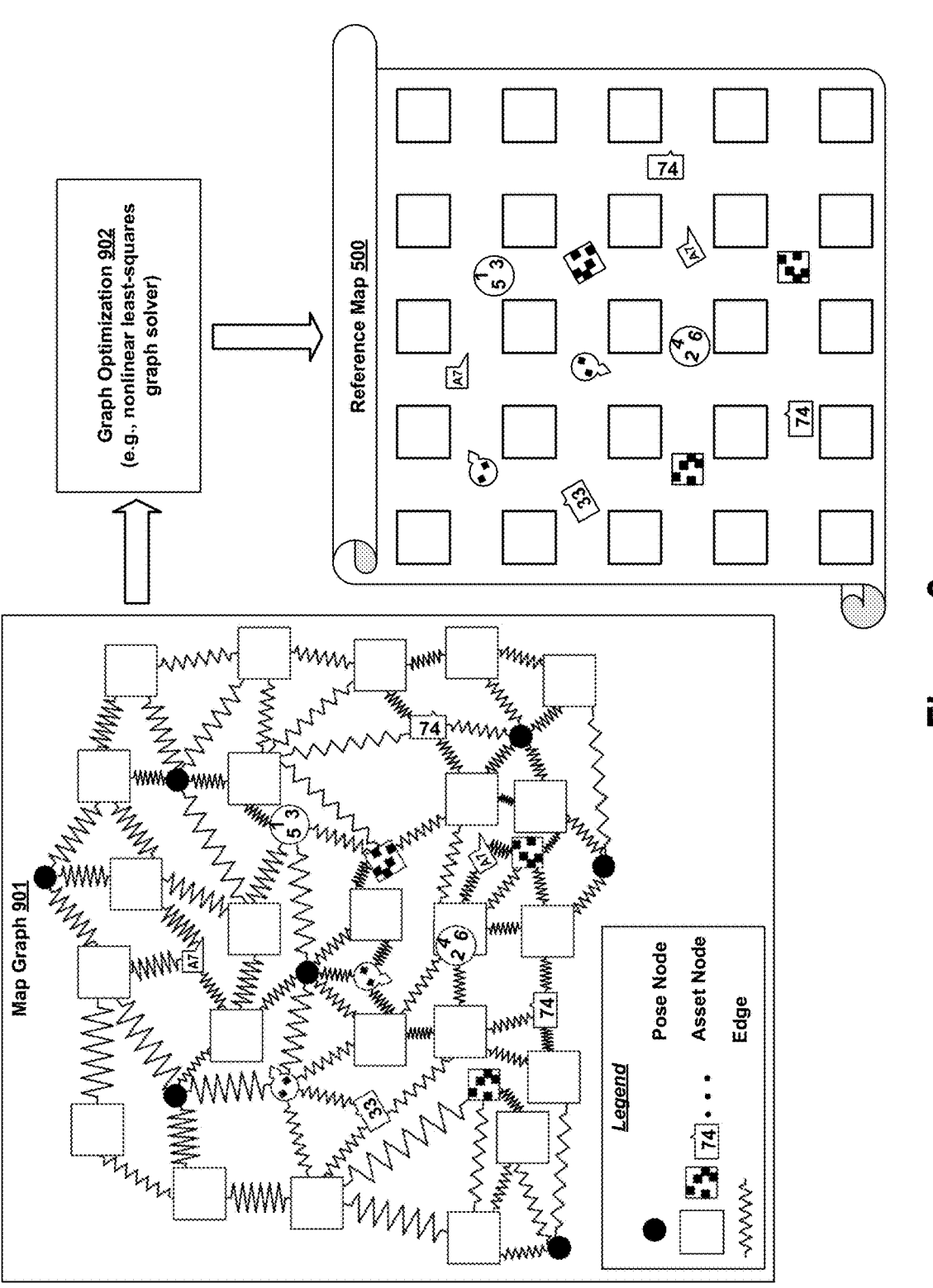
FIG. 9 is a conceptual illustration of a map graph and optimization thereof, in accordance with example embodiments.

Next, FIG. 9 is a conceptual illustration of a map graph 901 and optimization thereof, in accordance with example embodiments. In the example of FIG. 9, the map graph 901 reproduces the apparent positions of the assets of FIG. 8. For the sake of clarity in the figure, the apparent positions of the assets in the map graph 901 correspond to just a single pose (e.g., pose 701). In general, however, a map graph may include observations made from multiple different poses, possibly from multiple UAVs. Thus, map graph 901 also includes several poses, represented as black dots, even though the apparent positions from just a single pose are shown in this example illustration. Connecting edges, represented as springs, are shown between the poses and the assets, and also between some pairs of poses. The edges represent constraints between pairs of nodes, and the "spring constant" corresponds to the strength of the constraint. The map graph 901 thus forms a partially connected graph in this example. A legend in the lower left of the map graph 901 indicates the symbols for the nodes and edges.

In accordance with example embodiments, the map graph may be formulated analytically as a nonlinear least-squares optimization problem, which may seek to minimize a sum of terms expressed, in a general form, as $$\min_{x} \frac{1}{2} \sum_{i} \rho_i \left( \left\| f_i(x_i, \dots, x_{i_k}) \right\|^2 \right)$$

subject to $l_j \leq x_j \leq u_j$, where $\rho_i$ is a loss function, $f_i(\cdot)$ is a cost function, and $l_i$ and $u_i$ are upper and lower limits of the parameter $x_i$. In accordance with example embodiments, the minimization may be solved by a graph optimizer 902. The graph optimizer may be a nonlinear least-squares graph solver implemented computationally as computer-readable instructions carried out by a computing device or system, for example. Conceptually, the map graph 901 may be considered input to the graph optimizer 902, and the reference map 500 may be considered output, as indicated by the broad arrows in FIG. 9.

The depictions of FIGS. 8 and 9 may suggest or give the impression of a one-to-one relationship between the number of assets represented as nodes in the map graph 901 and the number in the generated reference map 500. While this could be the case in principle, in practice there may be more assets represented in the map graph 901 than are ultimately identified in the reference map 500. This is because the reference map 500 should, if properly generated, include only as many assets as actually exist in the observed cluster, while the map graph 901 is constructed from what may be an aggregate of observations of a cluster. The aggregate measurements may thus correspond to possibly multiple vectors to each of one or more observed assets from possibly multiple poses and/or multiple UAVs. As such, there may be multiple instances of a given asset represented as nodes in the map graph 901, each with a different apparent node position. There may also be multiple pose nodes in the map graph 901—which may be a reason for multiple vectors for some of the assets. In this sense, the map graph 901 may contain both discrepant (apparent) positions of the assets with respect to their true position, as well as possibly disparate positions among multiply-observed assets. It should be understood that the particular form of the map graph 901 is an example that serves as a conceptual illustration of SLAM or SLAM-like optimizations.

In accordance with example embodiments, the graph optimization procedure operates to effectively resolve both the discrepancies from true positions, as well as position disagreements among any multiply-observed asset. To the extent that solved positions of any multiply-observed asset in the map graph 901 do not align perfectly, the solved map graph 901 may yield clustering of solved reference map positions for that asset. In this case, some form of average (e.g., weighted average) of clustered positions may be determined and taken as the solved, true map position of the multiply-observed asset. Other methods for determining a solved position of a cluster of positions are possible as well. Thus, example embodiments may further include cluster analysis for identifying in clusters of positions, determining which positions may belong to an identified cluster, and computing a best solution to an asset position from a cluster of positions. It should be noted that use of the term "cluster" and the like in this context is distinct from (and should not be confused with) its use in connection with charging pad "clusters" (such as cluster 400).

The particular edges included in the map graph 901 are illustrative, and shown by way of example. Analytically, the form of map graph 901 imposes constraints only between certain pose nodes and certain asset nodes, and between certain pairs of pose nodes. Thus in this example, the optimization is not subject to constraints between asset nodes. In addition to solving for positions of the asset nodes in the reference map 500, the optimization may also yield solutions to the poses—e.g., solved positions and orientations that may be more accurate than the self-reported poses provided by UAVs in their aerial observation data. It should be understood that any given graph map constructed from reported aerial observation data may include different nodes and edges, possibly including edges between asset nodes. In any given analysis scenario, the nodes and edges included may depend on the specific aerial observations used and how the optimization problem is formulated in detail.

When a reference map is generated, it may either be a first-time map for a charging pad cluster, or a new map for a known cluster for which a previously generated map exists. Correspondingly, any given asset in a generated reference map may be a new asset not previously tracked by the asset manager, and for which no prior asset record exists, or may be a known asset of the UAV system with an existing asset record. A new asset may be determined either when its corresponding map is a first-time map, since a first-time map will typically include previously untracked assets, or when the asset has been newly added to an known cluster for which there is previously existing map and known, tracked assets. There may be other special or less typical situations which give rise to new maps and/or new assets. In any case, the asset manager 700 may adapt its operations of map graph construction, reference map generation, and asset tracking depending on whether the generated map is or will be new, and/or whether any of the assets of reference map are new.

In accordance with example embodiments, the asset manager 700 may determine that there is no existing map for a charging pad cluster by, for example, an absence of a reference map for the cluster in reference maps 711 of the stored asset tracking data 707. The asset manager 700 may make this determination using a cluster ID in received aerial observation data for the cluster. This scenario could correspond to the asset manager 700 receiving aerial observation data from one or more UAVs carrying out aerial surveys of a newly-deployed charging pad cluster, for example. Other scenarios are possible as well.

For first-time reference map generation for a given charging pad cluster, the asset manager 700 may wait for a threshold amount of aerial observation of the given cluster to be received before construction a map graph and generating the reference map in a manner described above. This could entail receiving and storing aerial observation data from multiple UAVs over multiple survey flights to the given cluster. Once the first-time reference map is generated, the asset manager 700 may store it in reference maps 711 of the asset tracking data 707. The asset manager 700 may also create an asset record for each asset identified in the first-time reference map, populating the fields accordingly and storing the records in assert records 709 of the asset tracking data 707.

In accordance with example embodiments, for an alternative scenario, the asset manager 700 may determine that there is an existing map for a charging pad cluster by, for example, finding a reference map for the cluster in reference maps 711 of the stored asset tracking data 707. Again, the asset manager 700 may make this determination using a cluster ID in received aerial observation data for the cluster. This scenario could correspond to the asset manager 700 receiving aerial observation data from one or more UAVs carrying out aerial surveys of a known and mapped charging pad cluster, for example. Additionally or alternatively, this scenario could correspond to the asset manager 700 receiving aerial observation data from one or more UAVs making routine flights to the charging pad cluster. Other scenarios are possible as well.

In further accordance with example embodiments, when generating a reference map for a known charging pad cluster with an existing map, the asset manager 700 may aggregate any newly-received aerial observation data with historical data stored in the asset records of the assets previously identified as belonging to the known cluster. In this way, a new map graph may be constructed from aerial observation data that accounts for both the new and historical observational data. Correspondingly, the generated reference map will also account for the aggregate observational data. When including historical data in the analysis process, the asset manager 700 may omit or exclude historical data that are older than some threshold age or look-back time. Alternatively, the asset manager 700 may cull the historical data from time to time (e.g., when generating new reference maps) to discard data older than a threshold age, such that the historical data only includes data "younger" than the threshold, making all of it suitable for inclusion with newly-received aerial observation data.

Application of an age threshold to exclude or omit historical data may act as a sliding window in map graph construction and reference map generation. The effect may be viewed as a sort of finite impulse response (FIR) filter on the analysis process. An alternative embodiment could be to include all historical data without any age thresholding. In this case, the effect may be viewed as a sort of Kalman filter on the analysis process. Either approach may be used, though the FIR filter approach may be more suited to excluding possibly obsolete and/or stale historical data.

Also in accordance with example embodiments, once a new reference map is generated for a known cluster, the asset manager 700 may compare the new map with the currently existing map stored in reference maps 711. The comparison may be used to identify differences between the two maps that may represent changes to the physical deployment of the known charging pad cluster. For example, a newly-added cluster asset may be identified by the comparison. As another example, an absence of a known asset, and/or changing in position of a known asset may be discovered in this way. Other types of changes or modifications may also be discovered.

For any discovered changes that meet some predefined or predetermined threshold or criteria, further actions by the asset manager 700 may be triggered. For example, discovery of a new charging pad may trigger a process to confirm agreement with a prior planned maintenance upgrade to the charging pad cluster. A similar confirmation procedure may be triggered by discovery of an absence of a previously known asset, or discovery of a displacement beyond a threshold distance of a previously known asset. Any indicated changes or modifications to the cluster that cannot be explained or verified as proper (e.g., via some form or planning or approval procedure) may then be subject to further review (e.g., by a human or automated review process) and/or may warrant physical inspection and/or maintenance at the cluster site.

Comparison between a new-generated map and a previously-existing map may further be used to produce an updated current reference map for a known charging pad cluster. This may involve resolving any discrepancies between the two maps of the comparison, and determining any updated map positions of previously known and tracked assets. The asset manager 700 may then store the updated current reference map in reference maps 711 according to the cluster ID, and update asset records for assets in updated map by storing newly-received aerial observation data with the historical data, and updating map positions (e.g., Xm and Ym) in the records as may be necessary (e.g., as determined by the map comparison).

In accordance with example embodiments, map graph construction and reference map generation may include and/or involve additional operations besides those described above that are illustrative of the basic principles. Some of the additional operations may be considered ancillary to data analysis procedures involving observational data or measurements, for example. Others may relate to contingencies and/or special circumstances that may arise in a UAV system.

One additional operation may involve preprocessing of aerial observation data to detect and possibly discard observational outliers—e.g., observations or measurements that can be identified as erroneous or below some quality threshold. This operation is sometimes referred to colloquially as "data sanitation." One example of outliers may include vector positions from poses having unreliable visibility to the associated assets, such as excessive ALG and/or horizontal distance from the cluster. Such vector positions may thus be unreliable. Another example may be measurements with uncertainties exceeding one or more thresholds.

After input data are sanitized, a correspondence between vectors and assets of the remaining data may be determined. Correspondence attempts to associate vectors with particular assets—e.g., charging pads and fiducials. This operation primarily applies when the (sanitized) vector data represent at least some multiply-observed assets. Correspondence of vectors with fiducial markers may be aided by identification markings on the fiducials, though, as described above, use of fiducial constellations allows non-unique markings within a charging pad cluster. However, by avoiding close proximity of identically marked fiducials during cluster deployment, fiducial markings may largely enable reliable determination of correspondence. Correspondence of vectors with charging pads may be more prone to errors, since charging pads are generally almost visibly indistinguishable. To the extent that mis-correspondences survive into the optimization process, result inaccuracies may be detected after the fact, and compensated by other techniques, such as iterative optimization passes with mis-correspondence corrections in between.

After a reference map is generated, further data sanitation may be carried out. This may involve detecting and removing assets that are misplaced in the map, as determined by some form of thresholding or heuristics. For example, an asset that appears beyond some threshold of the boundary of a charging pad cluster may be deemed errant and removed. As another example, if two distinct asset overlap in the map, one or both may be deemed errant. Other forms of post-map sanitation may be used as well.

VII. Example Initial UAV Geolocation and Orientation Determination from Uncalibrated Positional Observations In order for a UAV system to generate a flight mission plan for a UAV, and in order for the UAV to be able to fly a mission, the UAV's starting geolocation and orientation need to be known to some threshold degree of accuracy—e.g., 1-2 m. When a UAV first powers on, neither the UAV nor a UAV ground-support system in which the UAV operates will typically know its geolocation or orientation. Thus, a UAV that powers on needs its geolocation and orientation to be determined before a mission plan can be generated, and before the UAV can fly a mission. In addition, the UAV may need to perform various health and safety checks to achieve a state of flight readiness. These may include calibration of the UAV's navigation system according to the UAV's gcolocation and orientation.

While a UAV may determine its geolocation from GPS after powering on, the accuracy of such a determination may be limited due to direct or multipath interference of GPS signals at ground level where the UAV may be located when it powers on. One technique for improving GPS-based geolocation is for the UAV to ascend vertically to an AGL where GPS signal interference is reduced or eliminated. By way of example, this AGL could be 20 m. However, flights at AGLs of 20 m (and possibly somewhat lower) may be subject to aviation regulations, and/or incur various operational complexities related to mission planning for example. Thus, it would be desirable to be able to determine UAV initial geolocation and orientation after power-up without needing to rely on initial accurate GPS measurements (and correspondingly, without needing low-interference GPS signals), and/or without requiring flying above an AGL that might trigger aviation regulations or operational complexities.

Accordingly, the inventors have devised techniques and procedures for a UAV to use a low-altitude vertical flight to acquire visual data that can be transmitted to, and used by, a UAV ground-support system to determine the UAV's geolocation and orientation within a threshold accuracy. Because the UAV's geolocation and orientation may not be accurately determined when the visual data are acquired, the acquired visual data may be considered uncalibrated observations. Hence, the related systems and method described herein are referred to as initial UAV geolocation and orientation determination from uncalibrated positional observations. It should be understood that the techniques could also be applied to calibrated and/or accurate UAV positional observations as well.

Example embodiments may be understood in the context of charging pads and clusters, where UAVs typically start their missions after powering on. More particularly, a UAV may start a mission from a specific charging pad in a specific cluster. While the techniques and procedures described above for asset tracking and reference map generation may enable deployment of clusters without strict requirements for initial precise geolocations and orientations of charging pads and fiducials, repeated applications of map graph optimizations over numerous aerial observations from one or more UAVs may be expected to eventually yield reasonably accurate geolocations and orientations of tracked assets. And for clusters deployed in a mode that uses initial precise geolocations and orientation of cluster assets, corresponding reference maps may be accurate before—or even without—map graph optimization techniques. By way of example, geolocations of cluster assets in either mode of cluster deployment may be (or become) accurate to 1-2 m or less.

Thus, the identities (and thereby the known geolocations) of the specific cluster pad and specific cluster from which a UAV launches may be used to determine the UAV's initial geolocation. Similarly, known orientations of the particular pad and/or one or more nearby fiducials may be used to determine the UAV's orientation based on visual data, as described below. The concept of determining initial UAV geolocation and orientation from uncalibrated positional observations involves then, among other aspects, a UAV acquiring a low-altitude aerial image that sufficiently captures the UAV's launching pad directly below the UAV, as well as one or more nearby fiducials, for a server in a UAV support system to recognize and identify the assets in the image, and thereby determine their and the UAV's geolocation and orientation.

Example embodiments of initial UAV geolocation and orientation determination from uncalibrated positional observations may be further described by way of example operation. In an example usage scenario, a UAV in a powered-off state may be located on a particular pad in a particular cluster. The UAV may have placed on the particular pad by ground-support personnel in preparation for immediate or later power-on and mission activities, for example. In accordance with example embodiments, upon power-up, the UAV may determine its approximate geolocation and orientation (e.g., heading with respect to geographic or magnetic north) from GPS. As described above, the accuracy of the GPS-based geolocation obtained at ground level may be insufficient for mission planning or calibration of the UAV's navigation system. However, it may be sufficient to identify the charging cluster in which the UAV is located.

In further accordance with example embodiments, the UAV may also undertake a low-altitude vertical ascent directly above its still-unidentified launching pad. In accordance with example embodiments, the UAV may ascend to only 2-5 m AGL or even as low as 1-2 m AGL. The exact height need not necessarily be specified exactly, other than configuring it to be below a height the might otherwise subject the flight to one or more aviation regulations and/or flight operation complexities, and high enough to obtain an image of the particular charging pad and at least one nearby fiducial. While hovering (or holding station) at the low altitude, the UAV may capture an image of the particular charging pad and a portion of the cluster surrounding the particular charging pad, and within which one or more fiducial markers are observed. An example of such an image could be similar to the reference constellations 502-A or 502-B shown in FIG. 5, for example, except that the field of view (FOV) from low altitude may encompass a smaller area than the ones depicted in FIG. 5. For example, a low-altitude image of reference constellation 502-A might include the charging pad 402-A and just the two or three closest fiducials.

For purposes of the present discussion, an image captured at low altitude as described above will be referred to herein as a "low-altitude image" in order to distinguish its intended purpose from other images that a UAV may capture, such as those in connection with context-based navigation described above. It should be understood, however, that the principles described below in connection with processing and analysis of a low-altitude image, and observational information contained therein, are not necessarily limited to images captured at low altitude.

In accordance with example embodiments, the UAV may transmit both visual information in the image and its approximate geolocation and orientation to a server or other computing device or system in the UAV system 300, such as the asset manager 700 in the central dispatch system 310 in FIG. 7A, for example. The transmission may be carried via a wireless broadband cellular connection, such as that described above between UAV 100 and the asset manager 700. The asset manager may identify the particular charging cluster, as well as a list of assets-pads and fiducials—in the vicinity of the UAV's reported approximate geolocation. The list of assets may be referred to as a "candidate list." The candidate list and the approximate location of the UAV may thus provide a context for the asset manager 700 to match against the received visual information, and thereby identify the particular charging pad with a specific charging pad of the cluster. The known location of the specific charging pad may then be taken as the UAV's geolocation at launch. The matching procedure may also be applied to the image information of the one or more fiducials and their respective orientations in the context of the list of assets and the UAV's reported approximate geolocation and orientation to derive an accurate determination of the UAV's orientation.

In further accordance with example embodiments, the visual information of the image transmitted by the UAV may be a processed and condensed form of the low-altitude image. In particular, the UAV may process the low-altitude image to generate a condensed version of visual information that is descriptive of the particular charging pad and one or more fiducial markers captured in the image. A condensed data format may enable transmission of the information to the asset manager 700, via a wireless broadband cellular connection, using minimal bandwidth to incur low cost and low delay, particularly compared with otherwise transmitting a full digital image. By way of example, condensed information could specify pixel locations in the image of the particular charging pad and the one or more fiducials, as well as a respective identifying marking on each fiducial and an orientation indicator on each. This information could thus be sufficient for the asset manager 700 to reconstruct essential outlines of the image—e.g., relative locations and orientations of the particular pad and the one more fiducials-without having or needing the full digital low-altitude image. Other forms of image processing by the UAV and/or other formats of condensed image information may be used in addition or instead of the example above.

In accordance with example embodiments, the UAV may use its approximate geolocation from which it acquired the low-altitude image, together with the condensed image information derived from the UAV processing the acquired image, to construct a form of low-altitude observation data for its transmission to the asset manager 700. For purposes of the present discussion, and in consideration of the low-altitude image typically capturing just a portion of the cluster, the low-altitude observation data will be referred to herein as "cluster-portion observation data." This term may also help distinguish from the term "aerial observation data" used above. Cluster-portion observation data may include other information, such as an identity of the UAV that generated and transmitted the observation data.

Upon receiving cluster-portion observation data from a UAV, an asset manager 700 (or other server) may reconstruct essential outlines of the image, as described above. In an example, a reconstructed image outline may be thought of conceptually as just boundary outlines of a charging pad and one or more nearby fiducial captured in the corresponding low-altitude image. The reconstructed outline fiducials may also include identifying markings and orientation indicators. Additionally or alternatively, identifying markings and orientation indicators of the one or more fiducials may be determined by the UAV during processing, and included as data items in the cluster-portion observation data. Thus, while a charging pad-particularly one represented only in outline form, for example—may be indistinguishable from any other charging pad in the candidate list (or possibly anywhere in the cluster), the identifying markings on the outlined fiducials may allow the asset manager to identify specific fiducials in the candidate list.

Once the one or more outline fiducials in the reconstructed outline image are matched with one or more specific fiducials in the candidate list, the orientation indicators on (or associated with) the outline fiducials may be used to align the reconstructed image with known orientations of the specific fiducials. In an example, alignment could correspond to a rotation. With the reconstructed image oriented according to the specific fiducials, the asset manager 700 may then match the particular charging pad in the reconstructed image with a known charging pad in the candidate list. A successful match thus identifies the particular charging pad from which the UAV launched its low-altitude flight. Further, the reorientation of the reconstructed image may be used to accurately determine the UAV's orientation. The asset manager 700 may thus determine the UAV's geolocation and orientation for mission planning, and for reporting to the UAV. The UAV may then receive its accurate geolocation and orientation from the asset manager 700 (or other server), and thereby apply any necessary and/or appropriate calibration of its navigation system.

It may be noted that in both context-based navigation and asset tracking and management, described by way of example above, unique identifications of fiducials in a cluster need not necessarily be strictly enforced. However, with reasonable, minimal effort, the distribution of fiducials in a given cluster may be arranged such that any two or more fiducials with the same identification are spaced far enough apart to avoid confusing them with each other. Thus, the ability to match outlined assets in a reconstructed image with assets in a candidate list, while not necessarily guaranteed in every instance or application of the described operations, may be reasonable expected to be successful in most or (possibly all) instances.

In accordance with example embodiments, during a UAV's low-altitude flight above a not-yet-identified launch pad, it may obtain multiple low-altitude images and generate multiple cluster-portion observation data transmissions to the asset manager 700. The asset manager 700 may, in turn, carry out multiple image reconstruction and asset matching operations in order to help enhance reliability of, and/or confidence in, identification of the UAV's launching pad. In an example, if N separate determinations of charging pad identification are carried out, as described above, it may be specified that a threshold number of the N need to yield the same identification in order achieve at least a minimum confidence level of the identification. For example, a minimum confidence level could correspond to 0.8×N (e.g., converted to an integer minimum). Other fractional values could be used.

Notwithstanding an expected high degree of reliable launch pad identification using uncalibrated positional observations from a low-altitude UAV flight, example embodiments further include operations for confirming launch pad identification prior to a UAV departing its launch site for a mission flight. Thus, in accordance with example embodiments, a UAV may carry out further confirming operations after receiving its geolocation and orientation from the asset manager 700 (or other server), receiving a mission flight plan, and calibrating its navigation system. More particularly, when a UAV departs on a mission, it may first ascend to approximately 20 m directly above its launching pad. At this AGL, the UAV may obtain a GPS-based geolocation that is sufficiently accurate to check against the geolocation determined by the asset manager 700. If the UAV finds that it GPS-based geolocation agrees with the server-determined geolocation to a specified threshold, then the UAV may proceed on its mission. If, instead, the UAV discovers a disagreement greater than the threshold, it may postpose or abort the mission, and report the GPS-based geolocation to the asset manager 700 (or other server). The asset manager 700 may then reformulate the UAV's mission flight plan according to the GPS-based geolocation, and resend the update mission plan to the UAV. The UAV may then recalibrate its navigation system and proceed on the mission according to the updated plan.

In the event of reformulation of the plan based on the GPS location, the UAV may remain hovering at 20 m (or thereabouts) while awaiting the updated from the asset manager 700. Alternatively, the UAV may return to its launching pad while awaiting the updated plan. In still another alternative or option of operation, if a UAV discovers that its server-based geolocation disagrees with the GPS-based geolocation to greater than the threshold, the UAV and the asset manager 700 may try again to determine the UAV's geolocation and orientation from one or more additional low-altitude images. While this alternative may not be necessary since the UAV will have already obtained a GPS-based geolocation, there may be circumstances in which it is a viable and/or beneficial approach. In any case, this alternative need not be ruled out by the availability of a GPS-based geolocation determination.

In further accordance with example embodiments, a flight plan may include, among other information, one or more waypoints between its launching pad and landing pad of a mission. A waypoint is a predefined geolocation against which a UAV may check its navigation-based location to ensure it is following a flight plan correctly. One technique for implementing a check of a server-based geolocation against a GPS-based geolocation is to include the 20 m checkpoint above the launch pad as the first waypoint in the flight plan. Thus, the UAV may follow routine flight plan operations to its first waypoint, where it may then check the GPS-based geolocation against its server-based geolocation. Other techniques for implementing the check are possible as well.

VIII. Example Computing Systems and Cloud-Based Computing Environments

Figure 10A:
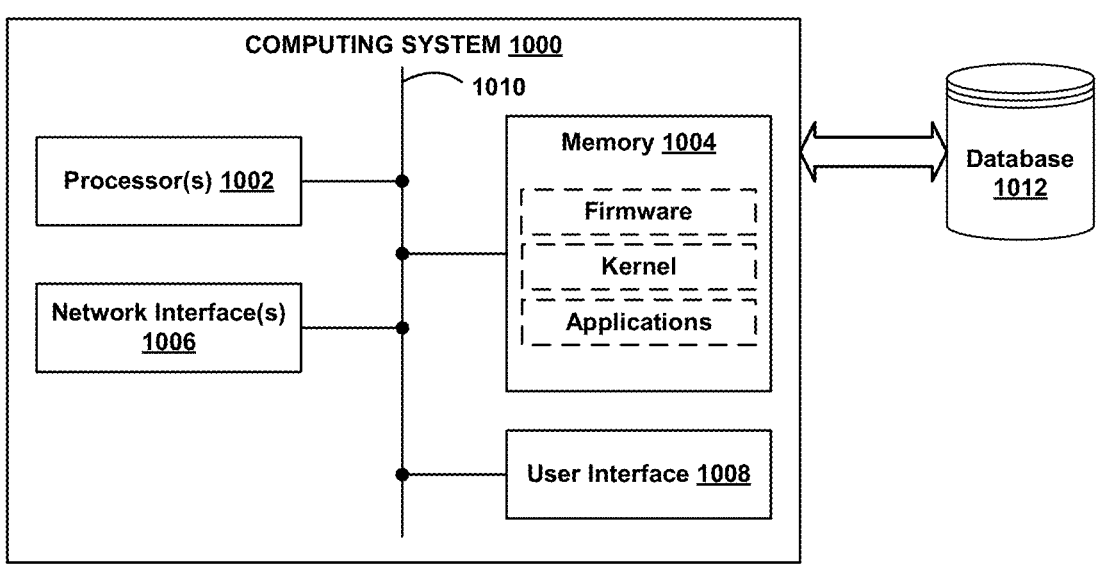
FIG. 10A is a simplified block diagram of an example computing system, in accordance with example embodiments.

FIG. 10A is a simplified block diagram of an example computing system (or computing device) 1000. The computing system 1000 can be configured to perform and/or can perform one or more acts, such as the acts described in this disclosure. As shown, the computing device 1000 may include processor(s) 1002, memory 1004, network interface(s) 1006, and an input/output unit 1008. By way of example, the components are communicatively connected by a bus 4010. The bus could also provide power from a power supply (not shown). Computing system 1000 may also include a database 1012, represented as an external component in the example of FIG. 10A.

Processors 1002 may include one or more general purpose processors and/or one or more special purpose processors (e.g., digital signal processors (DSPs) or graphics processing units (GPUs). Processors 1002 may be configured to execute computer-readable instructions that are contained in memory 1004 and/or other instructions as described herein.

Memory 1004 may include firmware, a kernel, and applications, among other forms and functions of memory. As described, the memory 404 may store machine-language instructions, such as programming code or non-transitory computer-readable storage media, which may be executed by the processor 1002 in order to carry out operations that implement the methods, scenarios, and techniques as described herein. In some examples, memory 1004 may be implemented using a single physical device (e.g., one magnetic or disc storage unit), while in other examples, memory 1004 may be implemented using two or more physical devices. In some examples, memory 1004 may include storage for one or more machine learning systems and/or one or more machine learning models as described herein.

In some instances, the computing system 1000 can execute program instructions in response to receiving an input, such as an input received via the network interface 1006 and/or the user interface 1008. The memory 1004 can also store other data, such as any of the data described in this disclosure.

The network interface 1006 can allow the computing system 1000 to connect with and/or communicate with another entity according to one or more protocols. In one example, the communication interface 1006 can be a wired interface, such as an Ethernet interface. In another example, the communication interface 406 can be a wireless interface, such as a cellular or WiFi interface.

The user interface 1008 can allow for interaction between the computing system 1000 and a user of the computing system 1000, if applicable. As such, the user interface 1008 can include, or provide an interface connection to, input components such as a keyboard, a mouse, a touch-sensitive panel, and/or a microphone, and/or output components such as a display device (which, for example, can be combined with a touch-sensitive panel), and/or a sound speaker.

The computing system 1000 can also include one or more connection mechanisms that connect various components within the computing system 1000. For example, the computing system 1000 can include a connection mechanism 1010 that connects components of the computing system 1000, as shown in FIG. 10A.

Network interface(s) 1006 may provide network connectivity to the computing system 1000, such as to the internet or other public and/or private networks. Networks may be used to connect the computing system 1000 with one or more other computing devices, such as servers or other computing systems. In an example embodiment, multiple computing systems could be communicatively connected, and example methods could be implemented in a distributed fashion.

Database 1012 may include storage for input and/or output data, such as records for tracking cluster assets.

In some configurations, the computing system 1000 can include one or more of the above-described components and can be arranged in various ways. For example, the computer system 1000 can be configured as a server, such as the asset manager 700, or other components depicted in FIG. 3, for example.

Figure 10B:
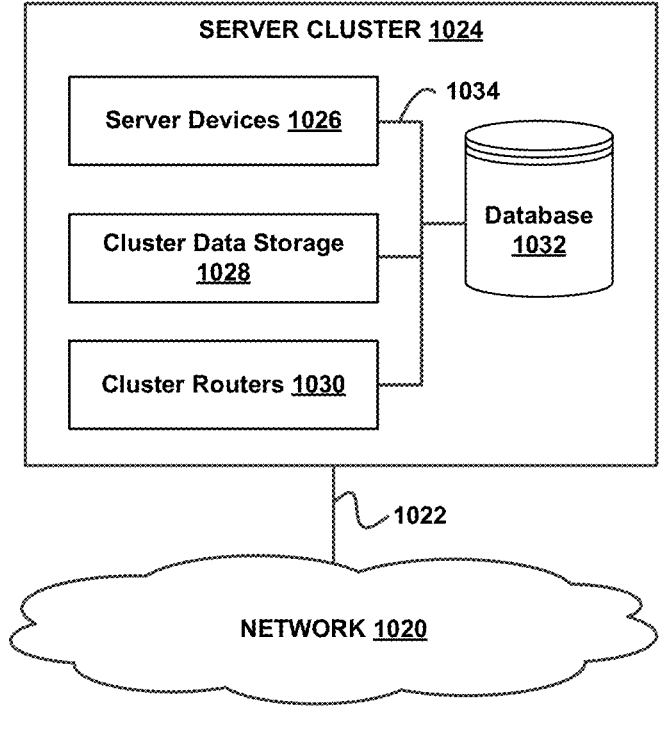
FIG. 10B is a simplified block diagram of an example server cluster, in accordance with example embodiments.

FIG. 10B depicts a cloud-based server cluster 1024 in accordance with example embodiments. In FIG. 10B, operations of a computing device (e.g., computing device 1000) may be distributed between server devices 1026, data storage 1028, and routers 1030, all of which may be connected by local cluster network 1034. The number of server devices 1026, data storages 1028, and routers 1030 in server cluster 1024 may depend on the computing task(s) and/or applications assigned to server cluster 1024.

For example, server devices 1026 can be configured to perform various computing tasks of computing device 1000. Thus, computing tasks can be distributed among one or more of server devices 1026. To the extent that these computing tasks can be performed in parallel, such a distribution of tasks may reduce the total time to complete these tasks and return a result. For purposes of simplicity, both server cluster 1024 and individual server devices 1026 may be referred to as a "server device." This nomenclature should be understood to imply that one or more distinct server devices, data storage devices, and cluster routers may be involved in server device operations.

Data storage 1032, also referred to database 1032, may be data storage arrays that include array controllers configured to manage read and write access to groups of hard disk drives and/or solid state drives. The drive array controllers, alone or in conjunction with server devices 1026, may also be configured to manage backup or redundant copies of the data stored in database 1032 to protect against drive failures or other types of failures that prevent one or more of server devices 1026 from accessing units of data storage 1032. Other types of memory aside from drives may be used.

Routers 1030 may include networking equipment configured to provide internal and external communications for server cluster 1024. For example, routers 1030 may include one or more packet-switching and/or routing devices (including switches and/or gateways) configured to provide (i) network communications between server devices 1026 and data storage 1032 via local cluster network 1032, and/or (ii) network communications between server cluster 1024 and other devices via communication link 1022 to network 1020.

Additionally, the configuration of routers 1030 can be based at least in part on the data communication requirements of server devices 1026 and data storage 1032, the latency and throughput of the local cluster network 1034, the latency, throughput, and cost of communication link 1022, and/or other factors that may contribute to the cost, speed, fault-tolerance, resiliency, efficiency, and/or other design goals of the system architecture.

As a possible example, data storage 1032 may include any form of database, such as a structured query language (SQL) database. Various types of data structures may store the information in such a database, including but not limited to tables, arrays, lists, trees, and tuples. Furthermore, any databases in data storage 1032 may be monolithic or distributed across multiple physical devices.

Server devices 1026 may be configured to transmit data to and receive data from data storage 1032. This transmission and retrieval may take the form of SQL queries or other types of database queries, and the output of such queries, respectively. Additional text, images, video, and/or audio may be included as well. Furthermore, server devices 1026 may organize the received data into web page or web application representations. Such a representation may take the form of a markup language, such as the hypertext markup language (HTML), the extensible markup language (XML), or some other standardized or proprietary format. Moreover, server devices 1026 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

IX. Example Method

FIG. 11 is a block diagram of method 1100, in accordance with example embodiments. More particularly, example method 1100 illustrates an example embodiment of automated discovery and monitoring of UAV ground-support infrastructure. In some examples, method 1100 may be carried out by a server in an infrastructure support network for UAVs, such as the asset manager 700 represented in FIG. 7. As described, the asset manager 700, or other server, may be implemented in or by a computing system, such as computing system 1000 and/or server cluster 1024, for example. Example methods may be implemented as computer-readable instructions that, when executed by one or more processors of a server or computing system, cause the server or computing system to carry out various operations of the method. Further, the computer-readable instructions may be stored in memory of the server or computing system that is accessible to the one or more processors. The computer-readable instructions may also be stored on one or more forms of storage media, including non-transitory computer-readable media. In addition to serving as a tangible product of manufacture for storage of computer-readable instructions, such storage media may also be used for transporting the instructions to a computing system in order to transfer or load the instructions into memory of the computing system.

At block 1102, method 1100 includes receiving first aerial observation data of a particular ground-based cluster of charging pads for UAVs from a first UAV. The particular cluster comprises cluster assets may include the charging pads arranged in a layout and a plurality of fiducial markers distributed at positions across the layout. The first aerial observation data may include position measurements of the first UAV at each of one or more aerial geolocations above a locale of the particular cluster, and vector positions of at least a first subset of the cluster assets with respect to the one or more aerial geolocations.

At block 1104, method 1100 includes generating a map graph from at least the first aerial observation data. The map graph may include (i) nodes corresponding to both the one or more aerial geolocations and the vector positions of the at least first subset of the cluster assets, and (ii) edges between pairs of selected nodes, the edges corresponding to distances between selected nodes and including measurement uncertainties.

Finally, at block 1106, method 1100 includes generating a particular spatial map of at least a particular subset of cluster assets of the particular ground-based cluster by computationally optimizing the map graph.

In accordance with example embodiments, method 1100 may further include receiving at least second aerial observation data of the particular ground-based cluster from at least a second UAV. The at least second aerial observation data may include position measurements of the at least second UAV at each of one or more second aerial geolocations above the locale of the particular cluster, and vector positions of at least a second subset of the cluster assets with respect to the one or more second aerial geolocations. In this case, generating the map graph from at least the first aerial observation data may include generating the map graph from the first aerial observation data and the at least second aerial observation data. Also in this case, the map graph may further include (i) nodes corresponding to both the one or more second aerial geolocations and the vector positions of the at least second subset of the cluster assets, and (ii) edges between pairs of selected nodes.

In further accordance with example embodiments, the first subset of cluster assets and the second subset of cluster assets may include at least partially overlapping subsets.

In accordance with example embodiments, receiving the first aerial observation data may entail receiving the first aerial observation data during a first time interval, and receiving the at least second aerial observation data of the particular ground-based cluster may entail receiving at least a portion of the at least second aerial observation data during a second time interval that is concurrent with the first time interval.

In accordance with example embodiments, receiving the first aerial observation data may entail receiving the first aerial observation data during a first time interval, and receiving the at least second aerial observation data of the particular ground-based cluster may entail receiving at least a portion of the at least second aerial observation data during a second time interval prior to the first time interval. In this case, method 1100 may further include: generating a prior spatial map of prior assets of the particular ground-based cluster based on an optimized map graph generated from the at least a portion of the at least second aerial observation data; and in a database associated with the computing system, storing (i) records of the prior assets of particular ground-based cluster, each record tracking a respective prior cluster asset according to information including an identifier, an optimally-derived position of the respective prior cluster asset, and prior vector locations of the respective prior cluster asset from the at least a portion of the at least second aerial observation data, and (ii) the prior spatial map.

In accordance with example embodiments, the first subset of the cluster assets may include all of the cluster assets of the particular ground-based cluster, and the particular subset of cluster assets of the particular cluster all of the cluster assets in the particular spatial map, or fewer than all of the cluster assets in the particular spatial map.

In accordance with example embodiments, the computing system may include or be associated with a database, such as asset database 712. The database may include records of known cluster assets of known ground-based clusters at known locales, a known spatial map of each known ground-based cluster. Each record may track a respective known cluster asset according to information including an identifier, an optimally-derived position of the respective known cluster asset, and previous vector locations of the respective known cluster asset from previously received aerial observation data from one or more UAVs. In this arrangement, method 1100 may further include determining that the particular cluster ground-based cluster and its particular subset of cluster assets are not among the known ground-based clusters and/or the known cluster assets, and updating the database. Updating the database may involve adding the particular ground-based cluster and its particular subset of assets in the records of known cluster assets, and adding the particular spatial map to the known spatial maps.

In accordance with example embodiments, method 11 may further include providing the particular spatial map to one or more UAVs that flight missions to the particular ground-based cluster.

In accordance with example embodiments, the computing system may include or be associated with a database, such as asset database 712. The database may include records of known cluster assets of known ground-based clusters at known locales, and a known spatial map of each known ground-based cluster. Each record may track a respective known cluster asset according to information including an identifier, an optimally-derived position of the respective known cluster asset, and previous vector locations of the respective known cluster asset from previously received aerial observation data from one or more UAVs. In this arrangement, method 1100 may further include determining that the particular ground-based cluster and its particular subset of cluster assets are among the known ground-based clusters and/or the known cluster assets; updating database records tracking the known cluster assets of the particular ground-based cluster with updated optimally-derived positions of the known cluster assets and with the vector locations of the known cluster assets from the received first aerial observation data; and updating the known spatial map of the particular ground-based cluster with the generated particular spatial map. Further, generating the map graph from at least the first aerial observation data may involve generating the map graph from the first aerial observation data and the previously received aerial observation data of the particular ground-based cluster. The map graph may further include (i) nodes corresponding to both one or more historical aerial geolocations and historical vector positions of previously identified cluster assets from the previously received aerial observation data, and (ii) edges between pairs of selected nodes.

In accordance with example embodiments, updating the database records tracking the known cluster assets of the particular ground-based cluster with updated optimally-derived positions of the known cluster assets may involve computationally optimizing the map graph comprising the first aerial observation data and the previously-received aerial observation data to generate the particular spatial map, and determining the updated optimally-derived positions according to positions of assets identified in the updated known spatial map.

In accordance with example embodiments, updating the known spatial map of the particular ground-based cluster with the generated particular spatial map may involve computationally optimizing the map graph that includes the first aerial observation data and the previously-received aerial observation data to generate the particular spatial map, and making a comparison of the particular spatial map with the known spatial map. Updating the known may then also include adding, removing, and/or updating assets and their positions in the known spatial map based on the comparison.

In accordance with example embodiments, method 1100 may further include providing the updated known spatial map to one or more UAVs that flight missions to the particular ground-based cluster.

In some examples, a non-transitory computer readable medium may include program instructions executable by one or more processors to perform operations. The operations may include the steps of method 1100.

Example method 1100 presents automated discovery and monitoring of UAV ground-support infrastructure, by way of example, in terms of operations of a backend server, such as the asset manager 700 or other computing system, in a UAV ground-support system. Example methods may also be specified in terms of a system that includes a server, a charging pad cluster, and at least one UAV. More specifically, a system may include a server in an infrastructure support network UAVs, a ground-based cluster of charging pads for UAVs, the ground-based cluster comprising cluster assets including the charging pads arranged in a layout and a plurality of fiducial markers distributed at positions across the layout, and a first a first UAV comprising a navigation system, a first imaging system, and a first control system.

As with example method 1100, methods specified in terms of multiple participating (or coordinated) components of a system may be implemented as computer-readable instructions that, when executed by one or more processors of the system, cause the system to carry out various operations of the method. The computer-readable instructions may be stored in memory of the one or more components of the system that are accessible to the one or more processors. The computer-readable instructions may also be stored on one or more forms of storage media, including non-transitory computer-readable media. An example of a method specified in terms of a server UAVs may be described as follows.

In accordance with example embodiments, a first control system of a first UAV may be configured to cause the first UAV to fly to one or more first aerial geolocations above the ground-based cluster, identify each of one or more first assets of the ground-based cluster from one or more aerial images captured by the first imaging system at the one or more first aerial geolocations, and determine first vector positions of the one or more first assets with respect to the one or more first aerial geolocations. The first control system may then send first aerial observation data to the server. The first aerial observation data may include position measurements of the first UAV at each of the one or more first aerial geolocations, and the first vector positions of the one or more first assets.

Also in accordance with example embodiments, the server may be configured to receive the first aerial observation data, and generate a map graph from at least the first aerial observation data. The map graph may include (i) nodes corresponding to both the one or more first aerial geolocations and the first vector positions of the one or more first cluster assets, and (ii) edges between pairs of selected nodes, the edges corresponding to distances between selected nodes and including measurement uncertainties. The server may then generate a spatial map of at least the one or more first cluster assets of the ground-based cluster by computationally optimizing the map graph.

In accordance with example embodiments, the origin of the flight of the first UAV to the one or more first aerial geolocations may be of a ground-based position within the ground-based cluster, or a ground-based position from within a different ground-based cluster.

In accordance with example embodiments, the first aerial observation data may further include orientation measurements of the first UAV at each of the one or more first aerial geolocations, and the position measurements of the first UAV at each of the one or more first aerial geolocations may be determined by a GPS system.

In accordance with example embodiments, the system may include a second UAV having a navigation system, a second imaging system, and a second control system. The second control system may be configured to cause the second UAV to fly to one or more second aerial geolocations above the ground-based cluster; identify each of one or more second assets of the ground-based cluster from one or more aerial images captured by the second imaging system at the one or more second aerial geolocations; determine second vector positions of the one or more second assets with respect to the one or more second aerial geolocations; and send second aerial observation data to the server. The second aerial observation data may include position measurements of the second UAV at each of the one or more second aerial geolocations, and the second vector positions of the one or more second assets. In this arrangement, the server may be further configured to receive the second aerial observation data. Further, generating the map graph from at least the first aerial observation data may involve generating the map graph from the first aerial observation data and the second aerial observation data. The map graph may further include (i) nodes corresponding to both the one or more second aerial geolocations and the second vector positions of the one or more second assets, and (ii) edges between pairs of selected nodes. Also in this arrangement, generating the spatial map of the at least the one or more first assets of the ground-based cluster may involve generating the spatial map of the one or more first and second assets of the ground-based cluster by computationally optimizing the map graph, and accounting for any overlapping first and second assets.

X. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above-detailed description describes various features and functions of the disclosed systems, devices, and methods with reference to the accompanying figures. In the figures, similar symbols typically identify similar components unless context dictates otherwise. The example embodiments described herein and in the figures are not meant to be limiting. Other embodiments can be utilized, and other changes can be made without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer-readable medium such as a storage device including a disk or hard drive or other storage medium.

The computer-readable medium may also include non-transitory computer-readable media such as computer-readable media that stores data for short periods of time like register memory, processor cache, and random access memory (RAM). The computer-readable media may also include non-transitory computer-readable media that stores program code or data for longer periods of time, such as secondary or persistent long-term storage, like read-only memory (ROM), optical or magnetic disks, compact-disc read-only memory (CD-ROM), for example. The computer-readable media may also be any other volatile or non-volatile storage systems. A computer-readable medium may be considered a computer-readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A computing system configured to perform operations comprising:

determining a cluster-portion observation data corresponding to an aerial image of a portion of a ground-based cluster of charging pads for aerial vehicles, wherein;

the ground-based cluster comprises the charging pads arranged in a layout and a plurality of fiducial markers distributed at positions across the layout, the aerial image was captured by an aerial vehicle (i) after the aerial vehicle initiated a flight from a particular charging pad within the portion of the ground-based cluster, (ii) while hovering above the particular charging pad, and (iii) prior to calibration of a navigation system of the aerial vehicle, and the cluster-portion observation data comprises (i) information indicating a position of the particular charging pad and (ii) positions of one or more fiducial markers within the portion of the ground-based cluster relative to the particular charging pad;

identifying at least one mapped fiducial marker in a stored reference map of the ground-based cluster that matches at least one of the one or more fiducial markers in the cluster-portion observation data;

identifying a mapped charging pad in the stored reference map as a match to the particular charging pad in the cluster-portion observation data, wherein the mapped charging pad is identified based on the at least one mapped fiducial marker and its position in the stored reference map relative to the mapped charging pad;

determining a geolocation and an orientation of the particular charging pad according to a recorded geolocation and orientation for the identified mapped charging pad;

determining, based on the geolocation and the orientation of the particular charging pad, location information indicating an initial geolocation of the aerial vehicle after the aerial vehicle initiated the flight from the particular charging pad; and causing the aerial vehicle to operate based on the location information to perform the calibration of the navigation system of the aerial vehicle.

2. The computing system of claim 1, wherein the aerial image was captured by the aerial vehicle while hovering above the particular charging pad at an altitude above ground level (AGL) that is below a threshold AGL at or above which at least one aviation regulation applies.

3. The computing system of claim 1, wherein the aerial image was captured by the aerial vehicle while hovering above the particular charging pad at an altitude above ground level (AGL) that is below a threshold AGL at or above which GPS-derived geolocation and/or orientation yields at least a threshold accuracy with at least a threshold likelihood.

4. The computing system of claim 1, wherein the cluster-portion observation data further comprises information indicating respective identifying and orientation markings on the one or more fiducial markers.

5. The computing system of claim 4, wherein identifying the at least one mapped fiducial marker in the stored reference map comprises:

comparing an identity and an orientation recorded for the at least one mapped fiducial marker to the respective identifying and orientation markings on the one or more fiducial markers in the cluster-portion observation data.

6. The computing system of claim 5, wherein identifying the at least one mapped fiducial marker in the stored reference map comprises:

based on comparing the identity and the orientation recorded for the at least one mapped fiducial marker to the respective identifying and orientation markings on the one or more fiducial markers in the cluster-portion observation data, reorienting at least part of the cluster-portion observation data to match an orientation of the stored reference map.

7. The computing system of claim 1, wherein the location information further indicates an orientation of the aerial vehicle, wherein the orientation of the aerial vehicle is reckoned with respect to an orientation of the particular charging pad.

8. The computing system of claim 1, wherein the location information further indicates that the aerial vehicle initiated the flight from the particular charging pad.

9. The computing system of claim 1, wherein causing the aerial vehicle to operate based on the location information comprises:

sending, via electronic transmission, the location information to the aerial vehicle.

10. The computing system of claim 1, wherein determining the cluster-portion observation data comprises:

receiving, from the aerial vehicle, the cluster-portion observation data.

11. The computing system of claim 1, comprising a server configured to perform one or more of:

determining of the cluster-portion observation data,
identifying of the at least one mapped fiducial marker,
identifying the mapped charging pad,
determining the geolocation and the orientation,
determining the location information, or
causing the aerial vehicle to operate to perform the calibration of the navigation system.

12. The computing system of claim 1, comprising the aerial vehicle, wherein the aerial vehicle is configured to perform one or more of:

determining of the cluster-portion observation data,
identifying of the at least one mapped fiducial marker,
identifying the mapped charging pad,
determining the geolocation and the orientation,
outputting determining the location information, or
causing the aerial vehicle to operate to perform the calibration of the navigation system.

13. The computing system of claim 1, wherein the flight from the particular charging pad comprises a vertical flight initiated upon power-up of the aerial vehicle after charging of the aerial vehicle using the particular charging pad.

14. The computing system of claim 1, wherein the cluster-portion observation data comprises:

one or more pixel locations of the particular charging pad in the aerial image;
one or more pixel locations of the one or more fiducial markers in the aerial image; and for each respective fiducial marker of the one or more fiducial markers, a corresponding identifying marking and a corresponding orientation indicator, and wherein the cluster-portion observation data omits at least some pixels of the aerial image.

15. The computing system of claim 1, wherein the plurality of fiducial markers comprises two or more fiducial markers having non-unique identifying markings, and wherein identifying the mapped charging pad comprises:

distinguishing the particular charging pad from other charging pads of the charging pads based on relative positions and orientations of the two or more fiducial markers within the cluster-portion observation data.

16. A computer-implemented method comprising:

determining a cluster-portion observation data corresponding to an aerial image of a portion of a ground-based cluster of charging pads for aerial vehicles, wherein;

the ground-based cluster comprises the charging pads arranged in a layout and a plurality of fiducial markers distributed at positions across the layout,
the aerial image was captured by an aerial vehicle (i) after the aerial vehicle initiated a flight from a particular charging pad within the portion of the ground-based cluster, (ii) while hovering above the particular charging pad, and (iii) prior to calibration of a navigation system of the aerial vehicle, and
the cluster-portion observation data comprises (i) information indicating a position of the particular charging pad and (ii) positions of one or more fiducial markers within the portion of the ground-based cluster relative to the particular charging pad;

identifying at least one mapped fiducial marker in a stored reference map of the ground-based cluster that matches at least one of the one or more fiducial markers in the cluster-portion observation data;

identifying a mapped charging pad in the stored reference map as a match to the particular charging pad in the cluster-portion observation data, wherein the mapped charging pad is identified based on the at least one mapped fiducial marker and its position in the stored reference map relative to the mapped charging pad;

determining a geolocation and an orientation of the particular charging pad according to a recorded geolocation and orientation for the identified mapped charging pad;

determining, based on the geolocation and the orientation of the particular charging pad, location information indicating an initial geolocation of the aerial vehicle after the aerial vehicle initiated the flight from the particular charging pad; and causing the aerial vehicle to operate based on the location information to perform the calibration of the navigation system of the aerial vehicle.

17. The computer-implemented method of claim 16, wherein the aerial image was captured by the aerial vehicle while hovering above the particular charging pad at an altitude above ground level (AGL) that is below a threshold AGL at or above which at least one aviation regulation applies.

18. The computer-implemented method of claim 16, wherein the aerial image was captured by the aerial vehicle while hovering above the particular charging pad at an altitude above ground level (AGL) that is below a threshold AGL at or above which GPS-derived geolocation and/or orientation yields at least a threshold accuracy with at least a threshold likelihood.

19. The computer-implemented method of claim 16, wherein the cluster-portion observation data further comprises information indicating respective identifying and orientation markings on the one or more fiducial markers, and wherein identifying the at least one mapped fiducial marker in the stored reference map comprises:

comparing an identity and an orientation recorded for the at least one mapped fiducial marker to the respective identifying and orientation markings on the one or more fiducial markers in the cluster-portion observation data.

20. An article of manufacture including a non-transitory computer-readable medium, having stored thereon program instructions that, upon execution by a computing device, cause the computing device to perform operations comprising:

determining a cluster-portion observation data corresponding to an aerial image of a portion of a ground-based cluster of charging pads for aerial vehicles, wherein:

the ground-based cluster comprises the charging pads arranged in a layout and a plurality of fiducial markers distributed at positions across the layout, the aerial image was captured by an aerial vehicle (i) after the aerial vehicle initiated a flight from a particular charging pad within the portion of the ground-based cluster, (ii) while hovering above the particular charging pad, and (iii) prior to calibration of a navigation system of the aerial vehicle, and the cluster-portion observation data comprises (i) information indicating a position of the particular charging pad and (ii) positions of one or more fiducial markers within the portion of the ground-based cluster relative to the particular charging pad;

identifying at least one mapped fiducial marker in a stored reference map of the ground-based cluster that matches at least one of the one or more fiducial markers in the cluster-portion observation data;

identifying a mapped charging pad in the stored reference map as a match to the particular charging pad in the cluster-portion observation data, wherein the mapped charging pad is identified based on the at least one mapped fiducial marker and its position in the stored reference map relative to the mapped charging pad;

determining a geolocation and an orientation of the particular charging pad according to a recorded geolocation and orientation for the identified mapped charging pad;

determining, based on the geolocation and the orientation of the particular charging pad, location information indicating an initial geolocation of the aerial vehicle after the aerial vehicle initiated the flight from the particular charging pad; and causing the aerial vehicle to operate based on the location information to perform the calibration of the navigation system of the aerial vehicle.

* * * * *